United States Patent
Zhang et al.

(10) Patent No.: US 12,392,921 B2
(45) Date of Patent: Aug. 19, 2025

(54) UNDERWATER FERROMAGNETIC TARGET DETECTION METHOD AND SYSTEM EMPLOYING MULTIPLE POWER FREQUENCY RADIATION SOURCES

(71) Applicants: Huazhong University of Science and Technology, Hubei (CN); Wuhan Institute of Technology, Hubei (CN)

(72) Inventors: Tianxu Zhang, Hubei (CN); Qinghui Zhang, Hubei (CN); Cheng Yang, Hubei (CN); Tao Zhang, Hubei (CN); Jiawei Wang, Hubei (CN); Jiandong Tan, Hubei (CN)

(73) Assignees: HUAZHONG UNIVERSITY OF SCIENCE AND TECHNOLOGY, Hubei (CN); WUHAN INSTITUTE OF TECHNOLOGY, Hubei (CN)

( * ) Notice: Subject to any disclaimer, the term of this patent is extended or adjusted under 35 U.S.C. 154(b) by 453 days.

(21) Appl. No.: 18/148,460

(22) Filed: Dec. 30, 2022

(65) Prior Publication Data
US 2023/0243997 A1    Aug. 3, 2023

(30) Foreign Application Priority Data
Dec. 31, 2021    (CN) .......................... 202111679624.7

(51) Int. Cl.
*G01V 3/17*    (2006.01)
*G01V 3/08*    (2006.01)
(Continued)

(52) U.S. Cl.
CPC ................ *G01V 3/17* (2013.01); *G01V 3/083* (2013.01); *G01V 3/165* (2013.01); *G01V 3/38* (2013.01)

(58) Field of Classification Search
CPC . G01V 3/08; G01V 3/087; G01V 3/12; G01V 3/17; G01V 3/083; G01V 3/165; G01V 3/38; H04B 13/02; Y02A 90/30
See application file for complete search history.

(56) References Cited

U.S. PATENT DOCUMENTS

| | | | |
|---|---|---|---|
| 10,132,952 B2 * | 11/2018 | Marsala | G01V 3/08 |
| 12,282,132 B2 * | 4/2025 | Zhang | G01V 3/081 |
| 2018/0348393 A1 * | 12/2018 | Hansen | G01V 3/081 |

FOREIGN PATENT DOCUMENTS

| | | | | |
|---|---|---|---|---|
| CN | 108415080 B | * | 5/2019 | ............... G01V 3/08 |
| CN | 111142163 A | * | 5/2020 | ............... G01V 3/08 |
| CN | 117233477 A | * | 12/2023 | |

* cited by examiner

*Primary Examiner* — Olumide Ajibade Akonai

(57) ABSTRACT

Disclosed are an underwater ferromagnetic target detection method and system employing multiple power frequency radiation sources, pertaining to the technical field of non-acoustic underwater detection. The method includes: a power transmission network generating a power frequency electromagnetic field in a spatial range, and an underwater ferromagnetic target generating an electromagnetic field under the combined action of the power frequency electromagnetic field and seawater inside and outside the underwater ferromagnetic target; if there are multiple ships on the water serving as secondary radiation sources acting on the underwater ferromagnetic target, obtaining a secondary magnetic field generated by the underwater ferromagnetic target, and adding the secondary magnetic field and the electromagnetic field generated by the underwater ferromagnetic target under the combined action of the power frequency electromagnetic field and the seawater inside and outside the underwater ferromagnetic target to obtain a total electromagnetic field generated by the underwater ferromagnetic target; and acquiring a power frequency electromagnetic field distribution around the underwater ferromagnetic (Continued)

target, and performing underwater ferromagnetic target detection according to the power frequency electromagnetic field distribution. The present invention can enhance power frequency electromagnetic field signals of an underwater ferromagnetic target, and achieves underwater ferromagnetic target detection.

10 Claims, 12 Drawing Sheets

(51) Int. Cl.
*G01V 3/165* (2006.01)
*G01V 3/38* (2006.01)

UNDERWATER FERROMAGNETIC TARGET DETECTION METHOD AND SYSTEM EMPLOYING MULTIPLE POWER FREQUENCY RADIATION SOURCES

TECHNICAL FIELD

The present invention pertains to the cross technical field of non-acoustic underwater detection and multi-dimensional signal processing technology, and more particularly, relates to an underwater ferromagnetic target detection method and system employing multiple radiation sources.

BACKGROUND

With the new trend of economic globalization, global trade is extremely close, and the total import and export volume of countries around the world, especially China, shows a rapid growth rate. Ship transportation is favored by global enterprises and businesses with its huge freight volume and efficient cargo security. As a result, the number of ships and the tonnage of ships in ship manufacturing enterprises increase year by year. Safety issues with the ships during navigation have always been the focus of attention.

Ferromagnetic objects such as shipwrecks and naval mines left by wars are widely studied in marine exploration. The shipwreck salvage and naval mine detection need accurate locating. At the same time, underwater shipwrecks and naval mines are also important elements that affect the marine navigation environment. The increasing range of activities of autonomous underwater vehicles and underwater robots has also become an important factor affecting the marine navigation. Detection of underwater ferromagnetic targets such as shipwrecks and underwater vehicles is particularly important for traveling of ships.

Existing underwater ferromagnetic target detection methods only employ a power frequency electromagnetic field generated by a power frequency power grid and acting on an underwater ferromagnetic target, and do not consider seawater as a good conductor that can enhance an induced current of the underwater ferromagnetic target in the power frequency electromagnetic field and accordingly enhance an electromagnetic field signal generated by the underwater ferromagnetic target, and also do not consider a ship on the water as a secondary radiation source which enhances the electromagnetic field signal generated by the underwater ferromagnetic target.

To sum up, although the prior art can achieve detection of underwater ferromagnetic targets, electromagnetic field signals generated by the underwater ferromagnetic targets are weak, rendering it impossible to achieve long-distance large-scale detection. Therefore, providing a method and a system for long-distance large-scale ferromagnetic target detection has become a top priority in the current underwater ferromagnetic target detection field.

SUMMARY OF THE INVENTION

In view of the defects of the prior art, the present invention provides an underwater ferromagnetic target detection method and system employing multiple power frequency radiation sources, which solve the technical problem in which existing techniques involve high costs, are likely to make inaccurate determination due to interference from seabed terrain and background noise, and do not support long-distance large-scale detection.

In order to achieve the above objective, the present invention provides an underwater ferromagnetic target detection method employing multiple power frequency radiation sources, comprising the following steps:

(1) a step in which a power frequency electromagnetic field and seawater act on an underwater ferromagnetic target: a power transmission network generating a power frequency electromagnetic field in a spatial range, the underwater ferromagnetic target generating an induced electromagnetic field under the action of the power frequency electromagnetic field, and seawater inside and outside the underwater ferromagnetic target generating alternating currents under the action of the power frequency electromagnetic field, and the alternating currents acting on the underwater ferromagnetic target to generate a secondary magnetic field; if there is a ship on the water serving as a secondary radiation source acting on the underwater ferromagnetic target, performing step (2); or, if there is no ship on the water serving as a secondary radiation source acting on the underwater ferromagnetic target, adding the induced electromagnetic field generated by the underwater ferromagnetic target and the secondary magnetic field generated by the underwater ferromagnetic target under the action of the seawater inside and outside the underwater ferromagnetic target to obtain a total electromagnetic field generated by the underwater ferromagnetic target, and performing step (3);

(2) a step in which the ship on the water serving as the secondary radiation source acts on the underwater ferromagnetic target: an induced current generated by the ship on the water under the action of the power frequency electromagnetic field (wave) generating a power frequency electromagnetic field (wave) serving as the secondary radiation source that acts on the underwater ferromagnetic target nearby, obtaining a secondary magnetic field generated by the underwater ferromagnetic target, and using the secondary magnetic field, the induced electromagnetic field generated by the underwater ferromagnetic target, and the secondary magnetic field generated by the underwater ferromagnetic target under the action of the seawater inside and outside the underwater ferromagnetic target as a total electromagnetic field generated by the underwater ferromagnetic target, and performing step (3); and (3) a step of performing underwater ferromagnetic target detection: the total electromagnetic field generated by the underwater ferromagnetic target disturbing the power frequency electromagnetic field, so as to acquire a power frequency electromagnetic field distribution around the underwater ferromagnetic target, and performing underwater ferromagnetic target detection according to the power frequency electromagnetic field distribution.

In an alternative embodiment, the step in which a power frequency electromagnetic field and seawater act on an underwater ferromagnetic target specifically comprises:

the power transmission network generating a power frequency electromagnetic field $\vec{B}^f$ in space, $\vec{B}^f$ being a temporal and spatial four-dimensional function; the power frequency electromagnetic field acting on the underwater ferromagnetic target and generating an induced electromagnetic field $\vec{B}_{induce}^T$;

the underwater ferromagnetic target being magnetized under the action of the power frequency electromagnetic field, and a magnetization thereof being proportional to an intensity of the power frequency electromagnetic field and a magnetic permeability of the underwater ferromagnetic target;

the underwater ferromagnetic target being controlled by introducing and discharging seawater during diving and surfacing processes, a large amount of seawater being present inside the underwater ferromagnetic target;

the seawater inside the underwater ferromagnetic target serving as an electrical conductor and generating an alternating current under the action of the power frequency electromagnetic field, and the alternating current acting on a secondary magnetic field $\vec{B}_{induce1}^{sea}$ generated by the underwater ferromagnetic target;

the seawater outside of and surrounding the underwater ferromagnetic target serving as an electrical conductor and generating an alternating current under the action of the power frequency electromagnetic field, and the alternating current acting on a secondary magnetic field $\vec{B}_{induce2}^{sea}$ generated by the underwater ferromagnetic target; and obtaining a total power frequency electromagnetic field $\vec{B}_{induce}^{enhance}$ generated by the underwater ferromagnetic target under the combined action of the power frequency electromagnetic field and the seawater inside and outside the underwater ferromagnetic target, a calculation formula for the total electromagnetic field $\vec{B}_{induce}^{enhance}$ being:

$$\vec{B}_{induce}^{enhance} = \vec{B}_{induce1}^{sea} + \vec{B}_{induce2}^{sea} + \vec{B}_{induce}^{T}$$

In an alternative embodiment, the step in which the ship on the water serving as the secondary radiation source acts on the underwater ferromagnetic target specifically comprises:

a single ship on the water generating an induced secondary field under the action of the power frequency electromagnetic field according to Faraday's law, and the induced secondary field serving as a secondary radiation source; when there are multiple ships on the water, adding secondary field vectors generated by the multiple ships on the water to obtain multiple secondary radiation sources, wherein when power frequency electromagnetic fields generated by the multiple secondary radiation sources act on the underwater ferromagnetic target, a calculation formula for a total secondary magnetic field $\vec{B}_{induce}^{ship}$ generated by the underwater ferromagnetic target is as follows:

$$\vec{B}_{induce}^{ship} = \sum_{i=1}^{n} \vec{B}_{induce1}^{ship}$$

where $\vec{B}_{induce1}^{ship}$ is a secondary magnetic field generated by the underwater ferromagnetic target when a single secondary radiation source acts on the underwater ferromagnetic target, and n represents the number of ships on the water; and under the action of the power frequency electromagnetic fields generated by the multiple secondary radiation sources, the total electromagnetic field generated by the underwater ferromagnetic target is $\vec{B}^{T}$:

$$\vec{B}^{T} = \vec{B}_{induce}^{ship} + \vec{B}_{induce}^{enhance}$$

In an alternative embodiment, the step of performing underwater ferromagnetic target detection specifically comprises:

establishing an underwater ferromagnetic target detection model, performing emulation on an underwater ferromagnetic target model according to Maxwell's electromagnetic equations, acquiring a power frequency electromagnetic field distribution around the underwater ferromagnetic target, and performing underwater ferromagnetic target detection according to the power frequency electromagnetic field distribution.

In an alternative embodiment, the establishing an underwater ferromagnetic target detection model is specifically as follows:

the establishing an underwater ferromagnetic target detection model comprises: establishing a power transmission network model, the underwater ferromagnetic target model, and a space domain model.

In an alternative embodiment, the establishing a power transmission network model specifically comprises:

acquiring a node distribution, an altitude, and a power transmission loop distribution of the power transmission network;

creating a curve layer of the power transmission network, using curves in the curve layer as a geometric description of power transmission loops, and using the geometric description as an excitation source for the underwater ferromagnetic target model;

setting parameters of the curves according to the node distribution and loop information of the power transmission network, and configuring a position distribution for the curves according to the altitude; and performing value assignment with respect to the excitation source of the underwater ferromagnetic target model according to magnitudes of transmission currents and transmission voltages of different loops in the transmission network.

In an alternative embodiment, the underwater ferromagnetic target model is specifically as follows:

the underwater ferromagnetic target model comprises: a geometric description of the underwater ferromagnetic target model, position coordinates of the center point of the underwater ferromagnetic target model, and material properties of the underwater ferromagnetic target model, wherein the geometric description of the underwater ferromagnetic target model is a hollow assembly composed of a plurality of conventional geometric bodies; the position coordinates of the center point of the underwater ferromagnetic target model are coordinates on the x, y, and z coordinate axes in a space rectangular coordinate system; the material properties of the underwater ferromagnetic target model comprise a relative permeability of a material of the underwater ferromagnetic target model, a relative conductivity of the material of the underwater ferromagnetic target model, a relative dielectric constant of the material of the underwater ferromagnetic target model, and a density of the material of the underwater ferromagnetic target model;

the underwater ferromagnetic target model is further subjected to finite element meshing, and the size of a mesh of the underwater ferromagnetic target model is adaptive according to the size of the underwater ferromagnetic target model.

In an alternative embodiment, the space domain model is specifically as follows:

the space domain model is a medium layer for propagation of the power frequency electromagnetic field; the medium layer comprises: an air layer, a sea layer, a land layer, a seabed layer, and an ionized layer; and the space domain model is further subjected to finite element meshing, and the size of a mesh of the space domain model is adaptive according to the size of the space domain model.

In an alternative embodiment, a step of verifying measured data is further included to follow the step of performing underwater ferromagnetic target detection, and specifically comprises:

respectively acquiring an original time domain signal in the presence of only the underwater ferromagnetic target and an original time domain signal in the presence of the ship on the water passing by the underwater ferromagnetic target; respectively performing Fourier transforms on the acquired original time domain signals, so as to obtain a magnetic field perturbation map in the presence of only the underwater ferromagnetic target and a magnetic field perturbation map in the presence of the ship on the water passing by the ferromagnetic target model; and through comparison of magnetic field intensities in the magnetic field perturbation maps, verifying that a power frequency electromagnetic field perturbation of the underwater ferromagnetic target is enhanced when the ship on the water passes by the underwater ferromagnetic target.

In another aspect, the present invention further provides an underwater ferromagnetic target detection system, comprising the following units:

a unit for a power frequency electromagnetic field and seawater to act on an underwater ferromagnetic target, configured to perform the following: a power transmission network generating a power frequency electromagnetic field in a spatial range, an underwater ferromagnetic target generating an induced electromagnetic field under the action of the power frequency electromagnetic field, and seawater inside and outside the underwater ferromagnetic target generating alternating currents under the action of the power frequency electromagnetic field, and the alternating currents acting on the underwater ferromagnetic target to generate a secondary magnetic field; if there is a ship on the water serving as a secondary radiation source acting on the underwater ferromagnetic target, proceeding to a unit for the ship on the water serving as the secondary radiation source to act on the underwater ferromagnetic target; or, if there is no ship on the water serving as a secondary radiation source acting on the underwater ferromagnetic target, adding the induced electromagnetic field generated by the underwater ferromagnetic target and the secondary magnetic field generated by the underwater ferromagnetic target under the action of the seawater inside and outside the underwater ferromagnetic target to obtain a total electromagnetic field generated by the underwater ferromagnetic target, and proceeding to a unit for performing underwater ferromagnetic target detection;

the unit for the ship on the water serving as the secondary radiation source to act on the underwater ferromagnetic target, configured to perform the following: an induced current generated by the ship on the water under the action of the power frequency electromagnetic field (wave) generating a power frequency electromagnetic field (wave) serving as the secondary radiation source that acts on the underwater ferromagnetic target nearby, obtaining a secondary magnetic field generated by the underwater ferromagnetic target, and using the secondary magnetic field, the induced electromagnetic field generated by the underwater ferromagnetic target, and the secondary magnetic field generated by the underwater ferromagnetic target under the action of the seawater inside and outside the underwater ferromagnetic target as a total electromagnetic field generated by the underwater ferromagnetic target, and proceeding to the unit for performing underwater ferromagnetic target detection; and the unit for performing underwater ferromagnetic target detection, configured to perform the following: the total electromagnetic field generated by the underwater ferromagnetic target disturbing the power frequency electromagnetic field, so as to acquire a power frequency electromagnetic field distribution around the underwater ferromagnetic target, and performing underwater ferromagnetic target detection according to the power frequency electromagnetic field distribution.

In general, compared with the prior art, the above technical solutions proposed in the present invention have the following beneficial effects:

The present invention provides an underwater ferromagnetic target detection method and system employing multiple power frequency radiation sources. According to the present invention, a power transmission network generates a power frequency electromagnetic field in space, an underwater ferromagnetic target generates an electromagnetic field under the combined action of the power frequency electromagnetic field and seawater inside and outside the underwater ferromagnetic target; if there are multiple ships on the water serving as secondary radiation sources acting on the underwater ferromagnetic target, secondary magnetic fields generated by the underwater ferromagnetic target are obtained, and the secondary magnetic fields and the electromagnetic field generated by the underwater ferromagnetic target under the combined action of the power frequency electromagnetic field and the seawater inside and outside the underwater ferromagnetic target are added to form a total electromagnetic field generated by the underwater ferromagnetic target; a power frequency electromagnetic field distribution around the underwater ferromagnetic target is acquired, and underwater ferromagnetic target detection is performed according to the power frequency electromagnetic field distribution.

The present invention uses a power frequency electromagnetic field generated by a power frequency power grid and acting on an underwater ferromagnetic target, while considering seawater as a good conductor which can enhance an induced current of the underwater ferromagnetic target in the power frequency electromagnetic field and accordingly enhance an electromagnetic field signal generated by the underwater ferromagnetic target, and considering a ship on the water as a secondary radiation source to enhance the electromagnetic field signal generated by the underwater ferromagnetic target.

DETAILED DESCRIPTION

To make the purpose, technical solution, and advantages of the present invention clearer, the present invention is further described in detail below in connection with the accompanying drawings and embodiments. It should be appreciated that the specific embodiments described here are used merely to explain the present invention and are not used to define the present invention.

Figure 1:
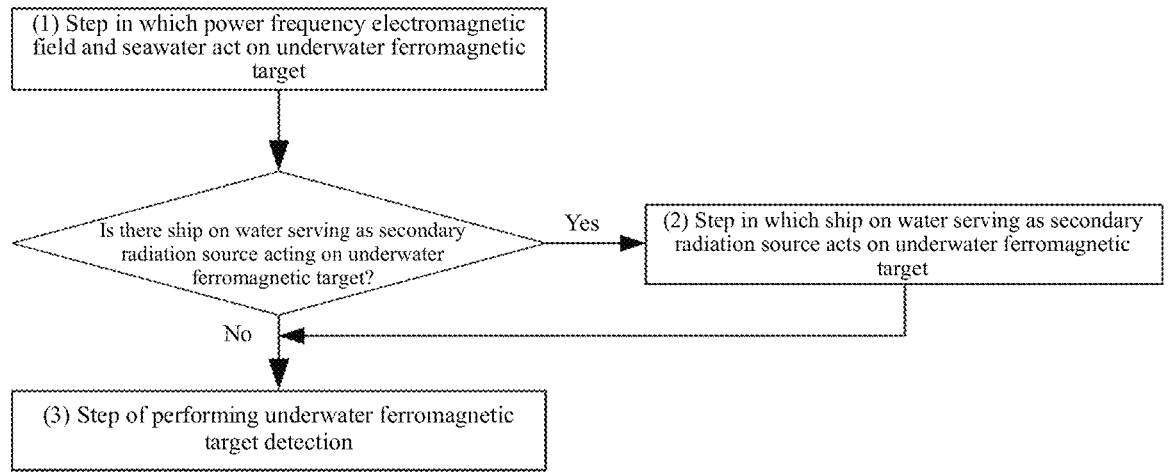
FIG. 1 is a flowchart of an underwater ferromagnetic target detection method employing multiple power frequency radiation sources according to the present invention.

As shown in FIG. 1, an underwater ferromagnetic target detection method employing multiple power frequency radiation sources of the present invention includes the following steps:

(1) a step in which a power frequency electromagnetic field and seawater act on an underwater ferromagnetic target: a power transmission network generating a power frequency electromagnetic field in a spatial range, an underwater ferromagnetic target generating an induced electromagnetic field under the action of the power frequency electromagnetic field, and seawater inside and outside the underwater ferromagnetic target generating alternating currents under the action of the power frequency electromagnetic field, and the alternating currents acting on the underwater ferromagnetic target to generate a secondary magnetic field; if there is a ship on the water serving as a secondary radiation source acting on the underwater ferromagnetic target, performing step (2); or, if there is no ship on the water serving as a secondary radiation source acting on the underwater ferromagnetic target, adding the induced electromagnetic field generated by the underwater ferromagnetic target and the secondary magnetic field generated by the underwater ferromagnetic target under the action of the seawater inside and outside the underwater ferromagnetic target to obtain a total electromagnetic field generated by the underwater ferromagnetic target, and performing step (3);

(2) a step in which the ship on the water serving as the secondary radiation source acts on the underwater ferromagnetic target: using the ship on the water as a secondary radiation source to act on the underwater ferromagnetic target, to obtain a secondary magnetic field generated by the underwater ferromagnetic target, and using the secondary magnetic field, the induced electromagnetic field generated by the underwater ferromagnetic target, and the secondary magnetic field generated by the underwater ferromagnetic target under the action of the seawater inside and outside the underwater ferromagnetic target as a total electromagnetic field generated by the underwater ferromagnetic target, and performing step (3); and (3) a step of performing underwater ferromagnetic target detection: the total electromagnetic field generated by the underwater ferromagnetic target disturbing the power frequency electromagnetic field, so as to acquire a power frequency electromagnetic field distribution around the underwater ferromagnetic target, and performing underwater ferromagnetic target detection according to the power frequency electromagnetic field distribution.

Specifically, Embodiment 1 of the present invention provides an underwater ferromagnetic target detection method employing multiple power frequency radiation sources. The following is a detailed technical solution, including the following steps:

(1) A step in which a power frequency electromagnetic field and seawater act on the underwater ferromagnetic target.

(1.1) The power frequency electromagnetic field (wave) magnetizing the underwater target.

A power transmission network will generate a power frequency electromagnetic field (wave) in surrounding space. Assuming that a power frequency electromagnetic field (wave) generated by a power grid in a certain region at any point in the space is $\vec{B}^f$, the underwater ferromagnetic target can be regarded as a large metal cavity, the underwater ferromagnetic target will be magnetized in an oscillating manner in the power frequency electromagnetic field (wave), producing an induced electromagnetic field perturbation $\vec{B}_{induce}^T$, where an intensity of the induced electromagnetic field perturbation is proportional to an original magnetic field intensity and the magnetic permeability of the underwater ferromagnetic target. A magnetized current produced from magnetization dominates a secondary current, and the magnetization can penetrate the underwater ferromagnetic target.

(1.2) A combined effect of a metal conductor and seawater surrounding the conductor.

The underwater ferromagnetic target can be regarded as a large metal cavity with seawater inside and outside.

The seawater inside the underwater ferromagnetic target is an electrical conductor, and generates an alternating current under the action of the power frequency electromagnetic field, and the alternating current acts on the underwater ferromagnetic target to generate a secondary magnetic field perturbation $\vec{B}_{induce1}^{sea}$.

A seawater cylinder surrounding the underwater ferromagnetic target is an electrical conductor, and generates an alternating current under the action of the power frequency electromagnetic field, and the alternating current acts on the underwater ferromagnetic target to generate a secondary magnetic field perturbation $\vec{B}_{induce2}^{sea}$.

The total power frequency magnetic field perturbation $\vec{B}_{induce}^{enhance}$ of the underwater ferromagnetic target can be expressed as:

$$\vec{B}_{induce}^{sea} = \vec{B}_{induce1}^{sea} + \vec{B}_{induce2}^{sea} + \vec{B}_{induce}^T$$

(2) A step of constructing an underwater ferromagnetic target detection model.

In this embodiment, the underwater ferromagnetic target detection model is constructed to detect an underwater ferromagnetic target, and the construction process of the underwater ferromagnetic target includes the following sub-steps:

(2.1) A sub-step of establishing a distributed power transmission network model.

Figure 2:
FIG. 2 is a schematic diagram of a Central China-East China-South China power grid according to the present invention.

In a process of electromagnetic field emulation performed by COMSOL software (hereinafter referred to as COMSOL), an electromagnetic field excitation source needs to be established. In this embodiment, China's power transmission network is used as an excitation source for the underwater ferromagnetic target model. First, a node distribution, an altitude, and a power transmission loop distribution of the power transmission network are acquired, and then a power transmission network model is built in a geometric modeling process in COMSOL. Specifically, a curve layer is created with geometry components in a component column of COMSOL, in which curves represent a geometric description of power transmission loops, and is used as the excitation source for the underwater ferromagnetic target. Parameters of the curves are set according to the node distribution and loop information of the power transmission network. After a position distribution of the curves is configured, value assignment is performed with respect to the excitation source according to magnitudes of transmission currents and transmission voltages of different loops in the power grid. In this example, a transmission/transformation/power consumption network in Central China-East China-South China is used as a power frequency electromagnetic field (wave) excitation source in an emulation process. In an actual modeling process, Okinawa, Japan is used as the origin of a Cartesian coordinate system of a model space, and each transmission node and transmission loop of the Central China-East China-South China power grid are sequentially established. The distributed power transmission network model is shown in FIG. 2.

(2.2) A sub-step of establishing a space domain model.

The power transmission network will generate power frequency electromagnetic fields (waves) in space. Therefore, a space domain model needs to be established to serve as an actual computational domain in the entire emulation process. The present invention mainly studies the influence of the underwater target on the entire power frequency electromagnetic field (wave); therefore, a space domain model including an air layer, a sea layer, a land layer, a seabed layer, and an ionized layer is established. In fact, during modeling in COMSOL, each medium layer is set as a curved surface of the earth's curvature. The power frequency electromagnetic field (wave) has different transmission characteristics in different materials; therefore, it is necessary to assign different material properties to different regions of a spatial computational domain.

In this example, the size of the air layer is: 6,000 km*6,000 km*60 km, the size of the sea layer is: 6,000 km*6,000 km*10 km, the size of the seabed layer is: 6,000 km*6,000 km*100 km, and the size of the ionized layer is: 6,000 km*6,000 km*270 km.

(2.3) A sub-step of establishing an underwater ferromagnetic target model.

The underwater ferromagnetic target model can be equivalent to a hollow assembly, which is represented by the following model:

$$M_{target} = (V_{target}, P, m_{target})$$

where $M_{target}$ represents the underwater ferromagnetic target model, $V_{target}$ represents a geometric description of the underwater ferromagnetic target model, P represents position coordinates of the center point of the underwater ferromagnetic target model, and $m_{target}$ represents material properties of the underwater ferromagnetic target model.

Figure 3:
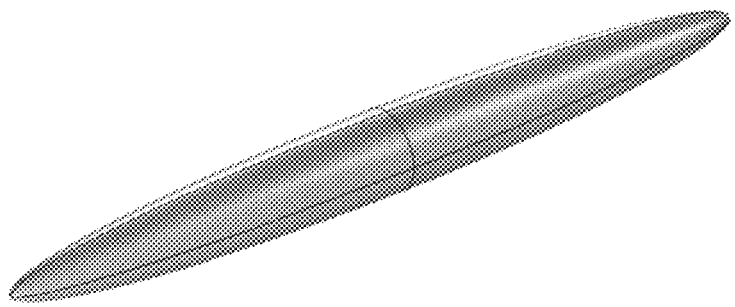
FIG. 3 is a schematic diagram of an underwater ferromagnetic target according to the present invention.

In this example, the underwater ferromagnetic target model is set as an underwater vehicle, and a variety of conventional geometric bodies (such as cuboid, prism, etc.) are used in the geometric modeling process to form an approximate model of a hull, as shown in FIG. 3.

Specifically, $P=(x_0, y_0, z_0)$, where $x_0, y_0, z_0$ represent three position coordinates of the center point of the underwater ferromagnetic target model in a space rectangular coordinate system; $m_{target}=(mur, sigma, epsilon, rho)$, where mur represents a relative permeability of the underwater ferromagnetic target material model, sigma represents a relative conductivity of the material of the underwater ferromagnetic target model, epsilon represents a relative dielectric constant of the material of the underwater ferromagnetic target model, and rho represents a density of the material of the underwater ferromagnetic target model. In this example, the material of the underwater ferromagnetic target model is iron, and the specific properties are set as: mur=400, sigma=1.12e7[S/m], epsilon=1, rho 7,870 [kg/cm^3].

(2.4) A Sub-Step of Finite Element Meshing.

Figure 4:
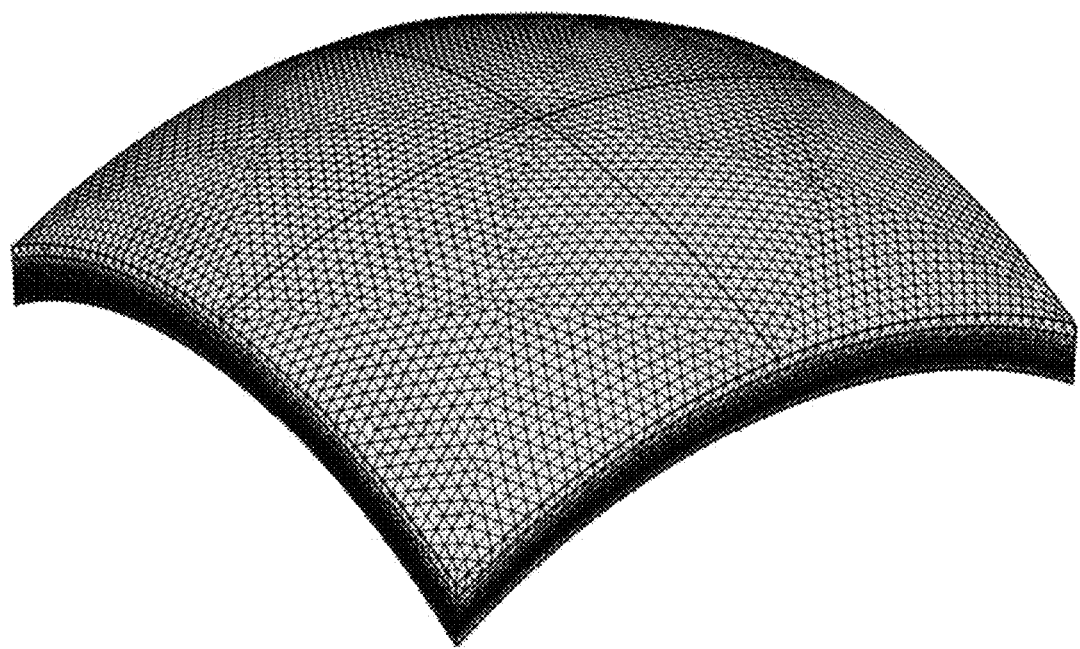
FIG. 4 is a schematic diagram showing a meshed medium layer according to the present invention.
Figure 5:
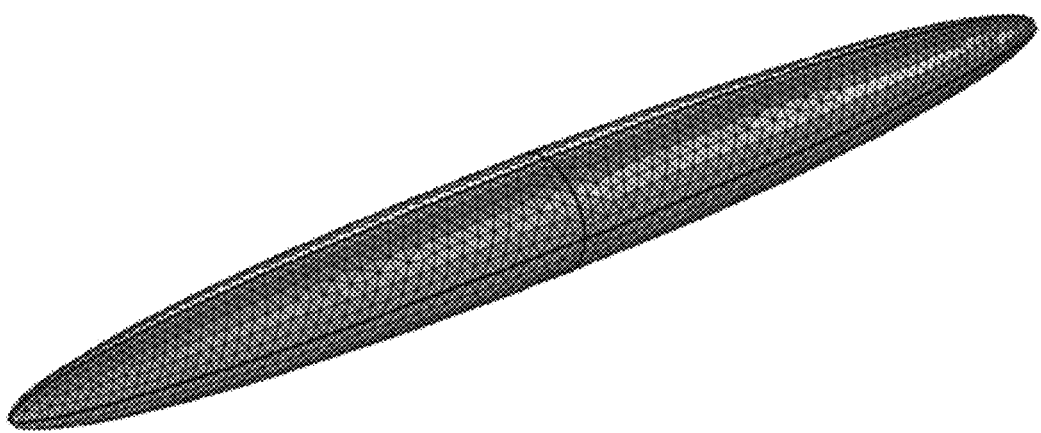
FIG. 5 is a schematic diagram showing a meshed underwater target according to the present invention.

Before COMSOL electromagnetic field emulation calculation is carried out, finite element meshing is a crucial step. Since air and water body are both described using cuboids, and the underwater target model is described using a hollow assembly, the two geometric models can be meshed in different fineness levels respectively. That is, a high-precision meshing size is used for the underwater target, and a higher-precision meshing size is used for other regions. Specifically, all geometric models are meshed into free tetrahedral meshes, and the maximum mesh size of the underwater vehicle is 5 m and the minimum mesh size is 2 m. A built-in "special refinement mode" of COMSOL is selected as the meshing mode of the medium layer, and the mesh size is adaptive according to the size of the model. The meshing of the medium layer is shown in FIG. 4, and the meshing of the underwater ferromagnetic target model is shown in FIG. 5.

(3) A step of performing emulation on the underwater ferromagnetic target detection model and acquiring an electromagnetic field distribution around the underwater ferromagnetic target model.

Based on Maxwell's equations, a power frequency electromagnetic field (wave) equation for the power transmission network can be established under constraints of boundary conditions:

$$\nabla \times \mu_r^{-1}(\nabla \times E) - k_0^2 \left( \varepsilon_r - \frac{j\sigma}{\omega \varepsilon_0} \right) E = 0$$

where $\nabla$ represents a differential operator, $\mu_r$ represents a relative permeability of a transmission medium, $\varepsilon_r$ represents a relative dielectric constant of the transmission medium, $\varepsilon_0$ represents a dielectric constant in vacuum, E represents an electric field vector, $k_0$ represents an equation parameter, and $\sigma$ represents an electrical conductivity.

Solution control parameters are set, a BiCGStab solver is used for the equations, and the solver is initialized with default settings. Upon completion of initialization, the number of steps of iterative calculation is set to 10,000 steps, and the emulation frequency is set to 50 Hz to calculate the solver.

Figure 6:
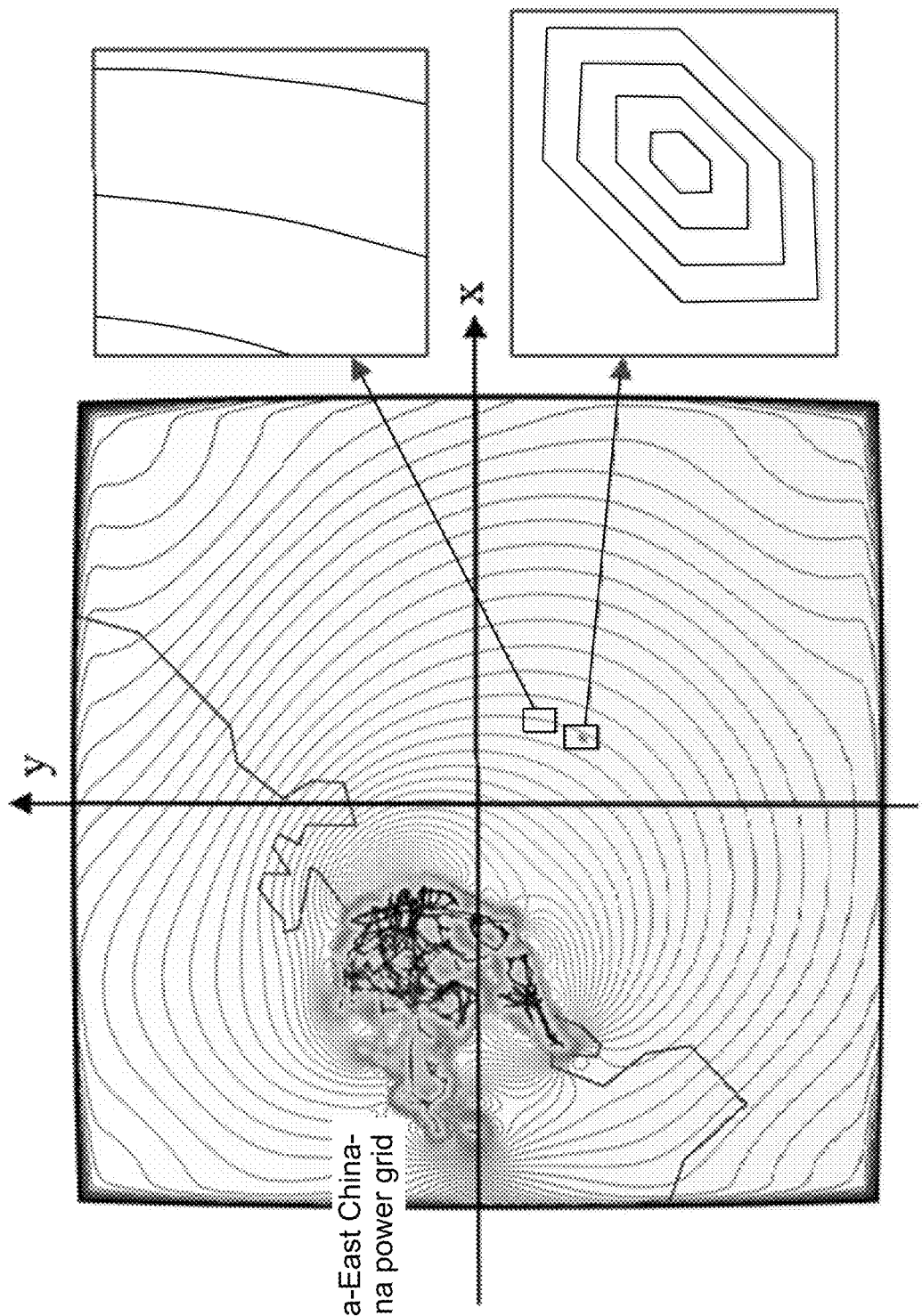
FIG. 6 is a magnetic field contour map according to Embodiment 1 of the present invention.
Figure 7:
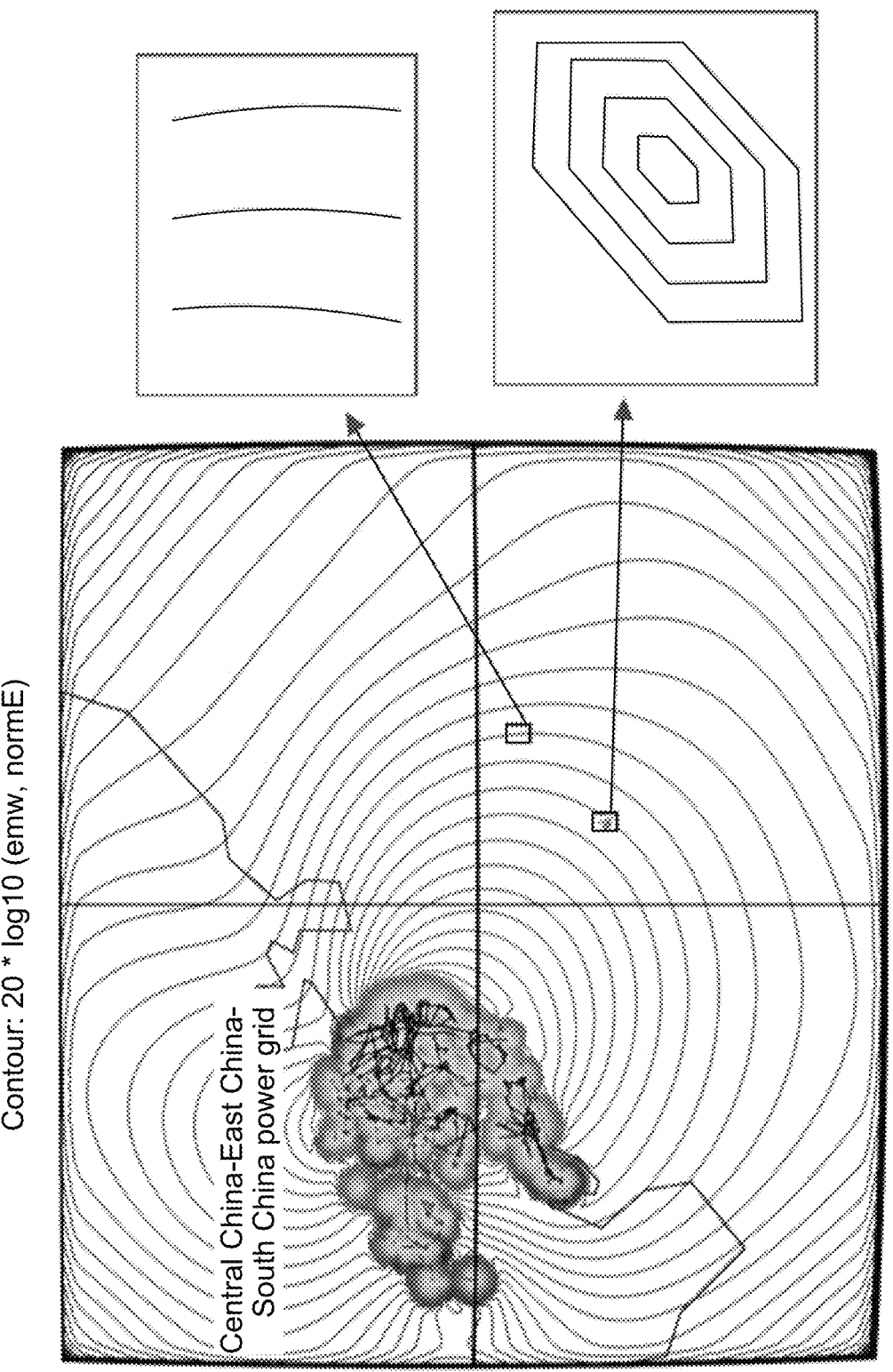
FIG. 7 is an electric field contour map according to Embodiment 1 of the present invention.

After the height of an observation plane is set to 10 km, by solving the power frequency electromagnetic field (wave) equation for the power transmission network, an electric field amplitude and a magnetic field amplitude at this height are obtained, and electric field contours and magnetic field contours are drawn. Specifically, first a contour drawing layer is created, the electric field amplitude and the magnetic field amplitude are selected as data sources, the number of contours is set to 200, the type of the contour is set to solid line, and a contour map of the power frequency electromagnetic field (wave) is drawn. FIG. 6 is a magnetic field contour map according to Embodiment 1 of the present invention, and FIG. 7 is an electric field contour map according to Embodiment 1 of the present invention.

Underwater ferromagnetic target detection is performed according to anomalies of the magnetic field amplitude and the electric field amplitude in the magnetic field contour map and the electric field contour map.

Specifically, an underwater ferromagnetic target detection system employing multiple power frequency radiation sources according to Embodiment 1 of the present invention includes the following units:

a unit for a power frequency electromagnetic field and seawater to act on an underwater ferromagnetic target, configured to perform the following: a power transmission network generating a power frequency electromagnetic field in a spatial range, an underwater ferromagnetic target generating an induced electromagnetic field under the action of the power frequency electromagnetic field, and seawater inside and outside the underwater ferromagnetic target generating alternating currents under the action of the power frequency electromagnetic field, and the alternating currents acting on the underwater ferromagnetic target to generate a secondary magnetic field; adding the induced electromagnetic field generated by the underwater ferromagnetic target and the secondary magnetic field generated by the underwater ferromagnetic target under the action of the seawater inside and outside the underwater ferromagnetic target to obtain a total electromagnetic field generated by the underwater ferromagnetic target;

a unit for constructing an underwater ferromagnetic target detection model, configured to perform the following: using emulation software to construct the underwater ferromagnetic target detection model, wherein the detection model includes establishing a power transmission network model, an underwater ferromagnetic target model, and a space domain model, and the underwater ferromagnetic target model and the space domain model are further subjected to infinite element meshing;

a unit for acquiring an electromagnetic field distribution around the underwater ferromagnetic target model, configured to perform the following: performing emulation on the underwater ferromagnetic target model according to Maxwell's electromagnetic equations, acquiring a power frequency electromagnetic field distribution around the underwater ferromagnetic target, and performing underwater ferromagnetic target detection according to the power frequency electromagnetic field distribution.

Specifically, an underwater ferromagnetic target detection method employing multiple power frequency radiation sources is provided in Embodiment 2 of the present invention. The following is a detailed technical solution, including the following steps:

(1) A step in which a power frequency electromagnetic field, seawater, and a ship on the water act on an underwater ferromagnetic target.

(1.1) The power frequency electromagnetic field (wave) magnetizing the underwater target.

A power transmission network will generate a power frequency electromagnetic field (wave) in surrounding space. Assuming that a power frequency electromagnetic field (wave) generated by a power grid in a certain region at any point in the space is $\vec{B}^f$, the underwater ferromagnetic target can be regarded as a large metal cavity, the underwater ferromagnetic target will be magnetized in an oscillating manner in the power frequency electromagnetic field (wave), producing an induced electromagnetic field perturbation $\vec{B}_{induce}^T$, where an intensity of the induced electromagnetic field perturbation is proportional to an original magnetic field intensity and the magnetic permeability of the underwater ferromagnetic target. A magnetized current produced from magnetization dominates a secondary current, and the magnetization can penetrate the underwater ferromagnetic target.

(1.2) A combined effect of a metal conductor and seawater surrounding the conductor.

The underwater ferromagnetic target can be regarded as a large metal cavity with seawater inside and outside.

The seawater inside the underwater ferromagnetic target is an electrical conductor, and generates an alternating current under the action of the power frequency electromagnetic field, and the alternating current acts on the underwater ferromagnetic target to generate a secondary magnetic field $\vec{B}_{induce1}^{sea}$.

A seawater cylinder surrounding the underwater ferromagnetic target is an electrical conductor, and generates an alternating current under the action of the power frequency electromagnetic field, and the alternating current acts on the underwater ferromagnetic target to generate a secondary magnetic field $\vec{B}_{induce2}^{sea}$.

The electromagnetic field $\vec{B}_{induce}^{enhance}$ generated by the underwater ferromagnetic target under the combined action of the power frequency electromagnetic field and the seawater inside and outside the underwater ferromagnetic target can be expressed as:

$$\vec{B}_{induce}^{enhance} = \vec{B}_{induce1}^{sea} + \vec{B}_{induce2}^{sea} + \vec{B}_{induce}^{T}$$

(1.3) Acquire a total electromagnetic field generated when the underwater ferromagnetic target and a ship on the water are both present.

Figure 8:
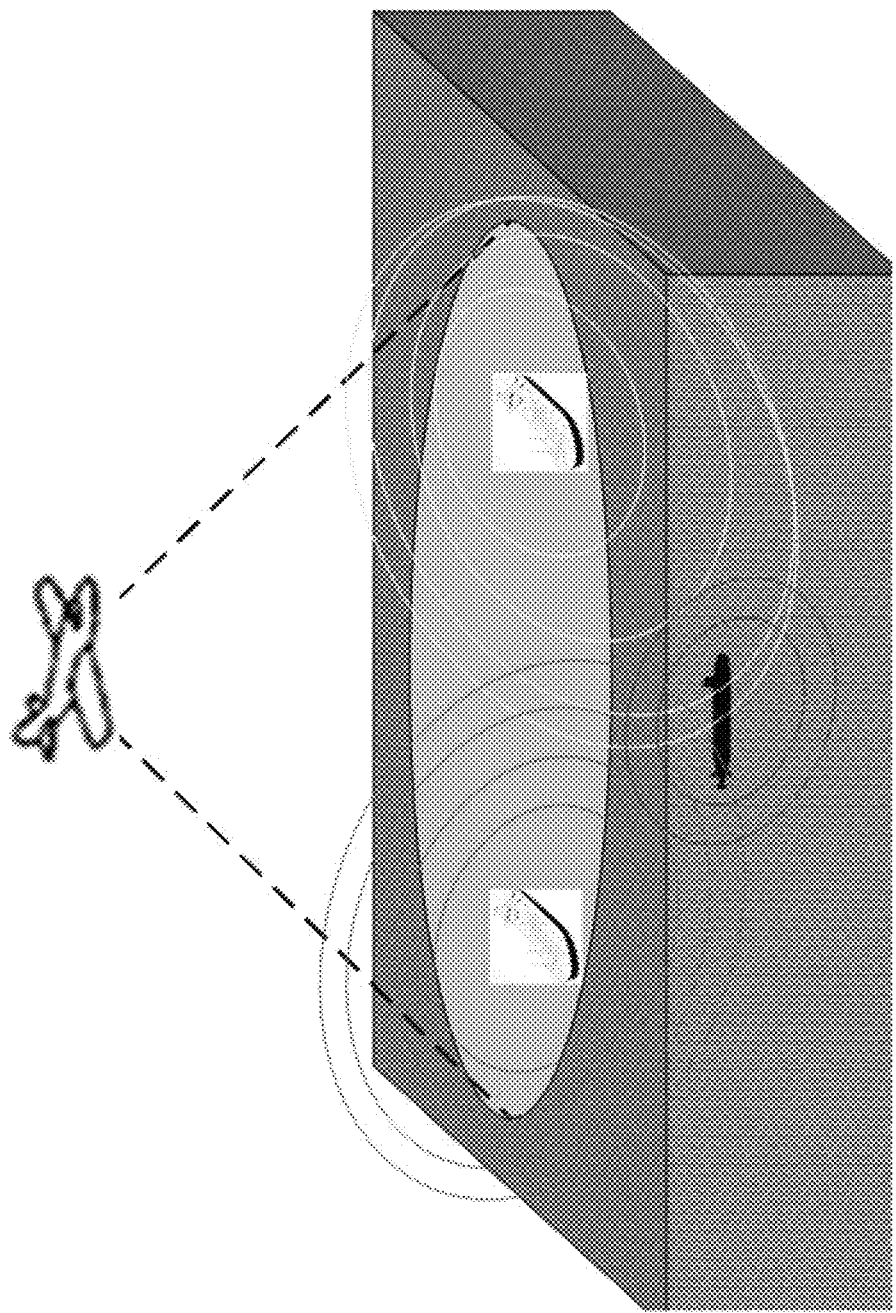
FIG. 8 is a schematic diagram of a ship on the water serving as a secondary radiation source according to Embodiment 2 of the present invention.

When the ship on the water and an underwater vehicle are both present, under the action of the power frequency electromagnetic field (wave), a secondary field (wave) of the ship on the water induces a secondary field according to Faraday's law, and the generated secondary field can be used as a secondary radiation source. A schematic diagram of the ship on the water serving as the secondary radiation source is shown in FIG. 8. When there are n ships on the water, a secondary radiation field generated thereby is the superposition of multiple secondary fields.

$$\vec{B}_{induce}^{ship} = \sum_{i=1}^{n} \vec{B}_{induce1}^{ship}$$

where $\vec{B}_{induce}^{sea}$ is a secondary magnetic field perturbation produced when all the ships act on the underwater vehicle, and $\vec{B}_{induce1}^{ship}$ is a secondary magnetic field perturbation produced when a single ship acts on the underwater vehicle.

The total electromagnetic field generated when the power frequency electromagnetic field (wave) generated by the power transmission network, the seawater inside and outside the underwater vehicle, and the ship on the water collectively act on the underwater vehicle is:

$$\vec{B} = \vec{B}_{induce}^{ship} + \vec{B}_{induce}^{enhance}$$

where $\vec{B}$ is the total electromagnetic field generated by the underwater ferromagnetic target.

(2) A step of constructing an underwater ferromagnetic target detection model.

(2.1) A sub-step of establishing a distributed power transmission network model.

The sub-steps described in Embodiment 2 of the present invention are the same as the sub-steps described in Embodiment 1 of the present invention.

(2.2) A sub-step of establishing a space domain model.

The sub-step described in Embodiment 2 of the present invention is the same as the corresponding sub-step described in Embodiment 1 of the present invention.

(2.3) A sub-step of establishing an underwater ferromagnetic target model and a ship-on-the-water model.

The underwater ferromagnetic target model and water surface propagation can be equivalent to a hollow assembly, which is represented by the following model:

$$M_{target} = (V_{target}, P, m_{target})$$

where $M_{target}$ represents a model abstraction, $V_{target}$ represents a geometric description of the target, P represents position coordinates of the geometric center of the target, and $m_{target}$ represents material properties of the target. In this example, the underwater ferromagnetic target type is set to be an underwater vehicle, and a variety of conventional geometries (such as cuboid, prism, ellipsoid, etc.) are used in the geometric modeling process to form an approximate model of the underwater vehicle and the ship on the water.

Specifically, $P=(x_0, y_0, z_0)$, where $x_0, y_0, z_0$ represent three position coordinates of the center point of the underwater ferromagnetic target in a space rectangular coordinate system; $m_{target}$=(mur, sigma, epsilon, rho), mur is a relative permeability of a material of the underwater ferromagnetic target, sigma is a relative conductivity of the material of the underwater ferromagnetic target, epsilon is a relative dielectric constant of the material of the underwater ferromagnetic target, and rho represents a density of the material of the underwater ferromagnetic target. In this example, the material of the underwater ferromagnetic target is iron, and the specific properties are set as: mur=400, sigma=1.12e7[S/m], epsilon=1, rho 7,870 [kg/cm^3].

Figure 9:
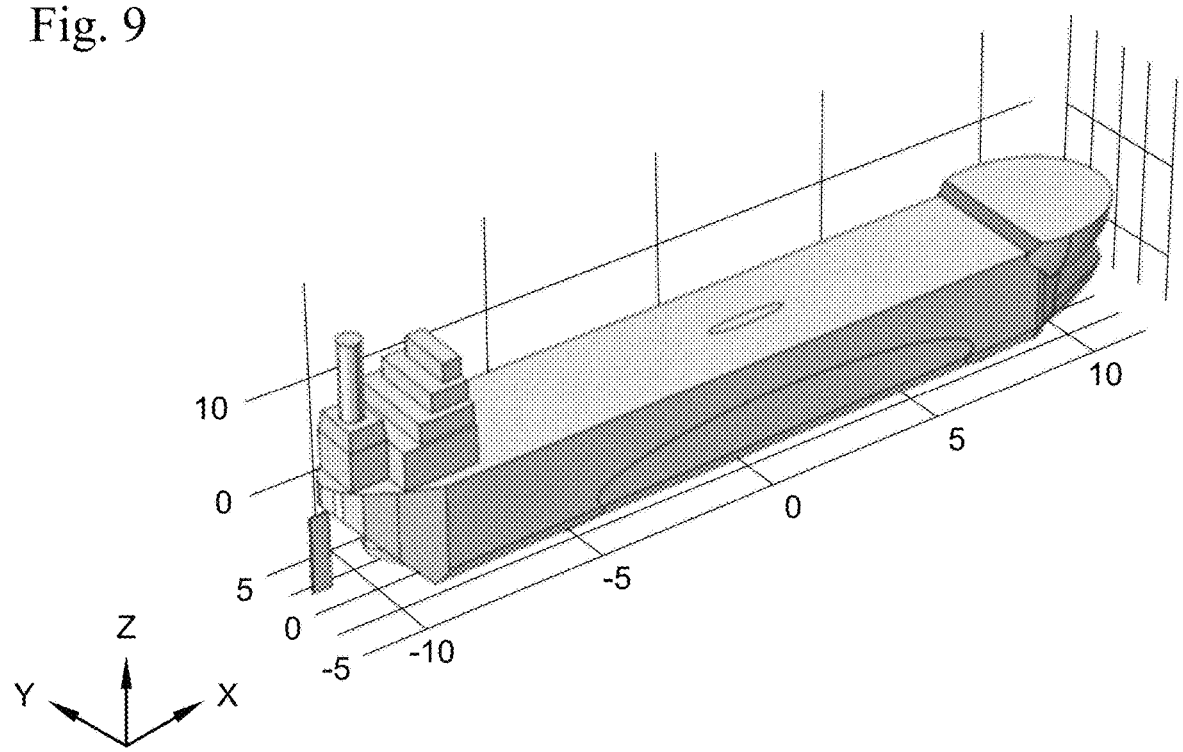
FIG. 9 is a schematic diagram of a ship on the water according to Embodiment 2 of the present invention.

In Embodiment 2 of the present invention, the underwater vehicle is located at a depth of 100 m underwater, with a long axis of about 100 m and an outer diameter of about 8 m. The ship is located above water, and has a length of about 50 m, a width of about 20 m and a height of about 20 m, as shown in FIG. 9.

(2.4) A sub-step of finite element meshing.

Figure 10:
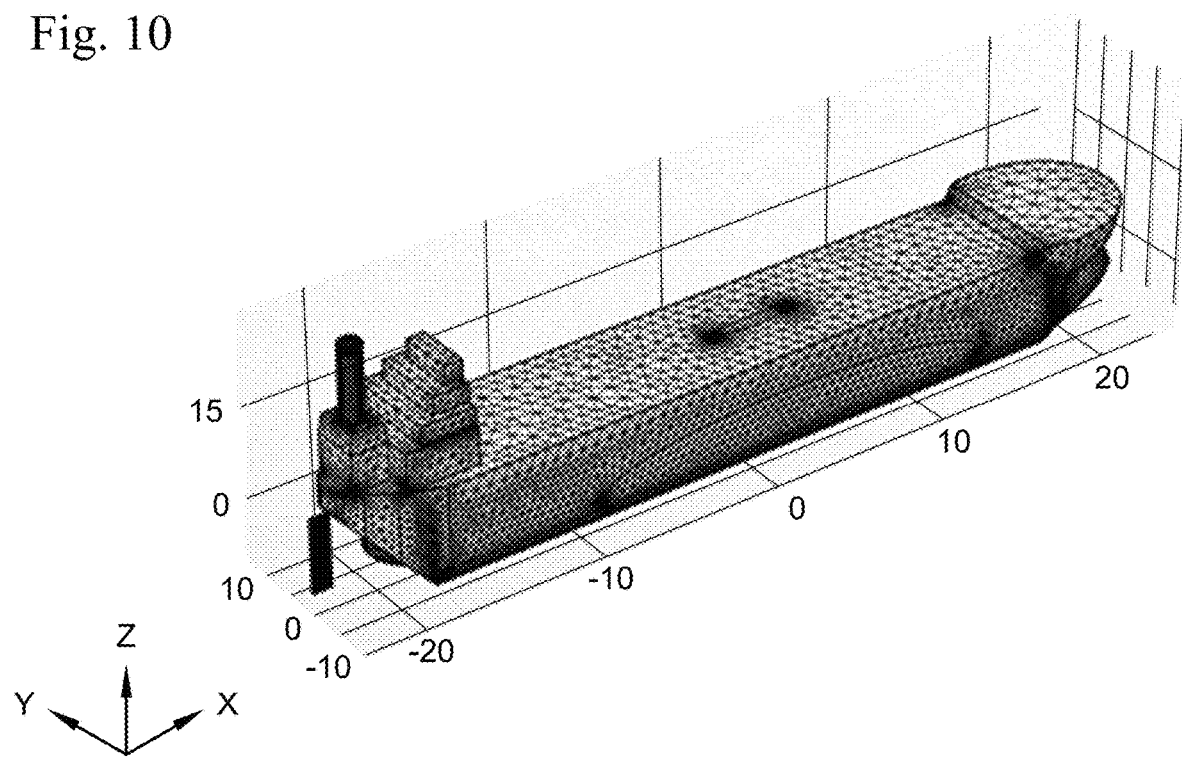
FIG. 10 is a schematic diagram showing a meshed ship on the water according to Embodiment 2 of the present invention.

Before COMSOL power frequency electromagnetic field (wave) emulation calculation is carried out, finite element meshing is a crucial step. Since air and water body are both described using cuboids, and the underwater ferromagnetic target model and the ship on the water are described using hollow assemblies, the two types of geometric models can be meshed in different fineness levels. Specifically, all geometric models are meshed into free tetrahedral meshes, where the maximum mesh size of the ship on the water is 5 m and the minimum mesh size is 1 m; the maximum mesh size of the underwater vehicle is 5 m and the minimum mesh size is 2 m. A built-in "special refinement mode" of COMSOL is selected as the meshing mode of the water body layer and the air layer, and the mesh size is adaptive according to the size of the model. The meshing result of the ship-on-the-water geometric model is shown in FIG. 10.

(3) A step of acquiring an electromagnetic field distribution around the underwater ferromagnetic target model.

After the finite element meshing is performed on the spatial computational domain, boundary conditions of a COMSOL RF physical field are set, and steady-state emulation calculation in the frequency domain is carried out. Based on Maxwell's equations, a power frequency electromagnetic field (wave) equation for the power transmission network can be established under constraints of the boundary conditions:

$$\nabla \times \mu_r^{-1}(\nabla \times E) - k_0^2\left(\varepsilon_r - \frac{j\sigma}{\omega\varepsilon_0}\right)E = 0$$

where $\nabla$ represents a differential operator, $\mu_r$ represents a relative permeability of a transmission medium, $\varepsilon_r$ represents a relative dielectric constant of the transmission medium, $\varepsilon_0$ represents a dielectric constant in vacuum, E represents an electric field vector, $k_0$ represents an equation parameter, and $\sigma$ represents an electrical conductivity. The electric field vector is obtained by performing emulation according to the above equation, and a magnetic field vector is obtained by converting the electric field vector, thereby obtaining the power frequency electromagnetic field (wave) distribution of the power transmission network.

Solution control parameters are set, a BiCGStab solver is used for the equations, and the solver is initialized with default settings. Upon completion of initialization, the number of steps of iterative calculation is set to 10,000 steps, and the emulation frequency is set to 50 Hz to perform computation by the solver.

By solving the power frequency electromagnetic field (wave) equation for the power transmission network, the total power frequency electromagnetic field perturbations generated when the underwater vehicle and the ship on the water are spaced apart by different distances are obtained.

Figure 11A:
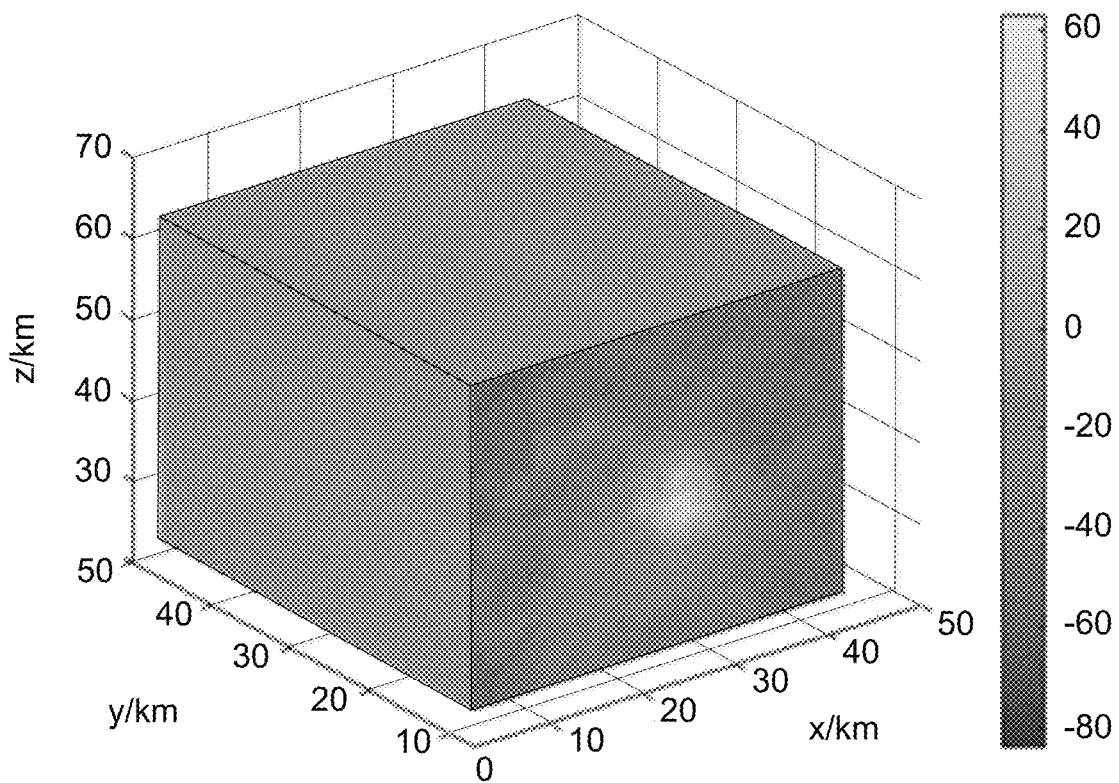
FIG. 11(a) is a schematic diagram of a power frequency magnetic field perturbation produced when a ship on the water and an underwater ferromagnetic target are 1 km apart according to Embodiment 2 of the present invention.
Figure 11B:
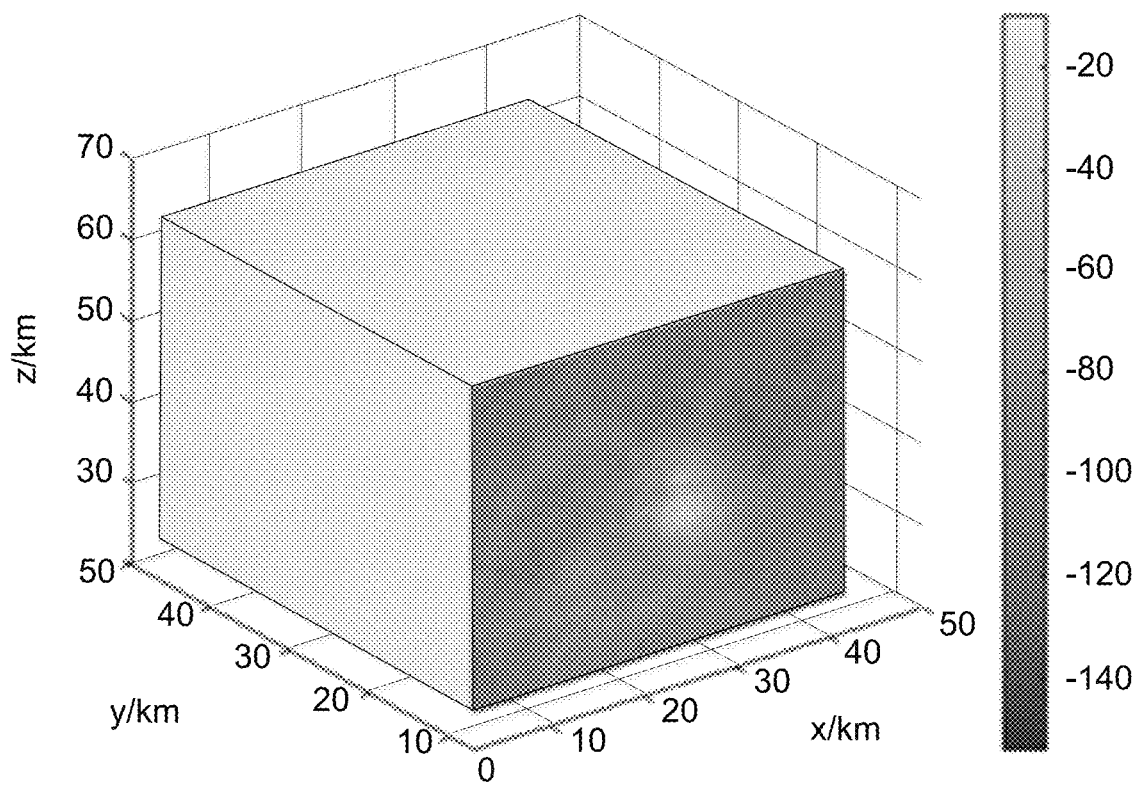
FIG. 11(b) is a schematic diagram of a power frequency electric field perturbation produced when the ship on the water and the underwater ferromagnetic target are 1 km apart according to Embodiment 2 of the present invention.

When the distance between the underwater vehicle and the ship on the water is 1 km, the power frequency magnetic field perturbation map around the underwater ferromagnetic target is shown in FIG. 11(a), and the power frequency electric field perturbation map around the underwater ferromagnetic target is shown in FIG. 11(b).

Figure 12A:
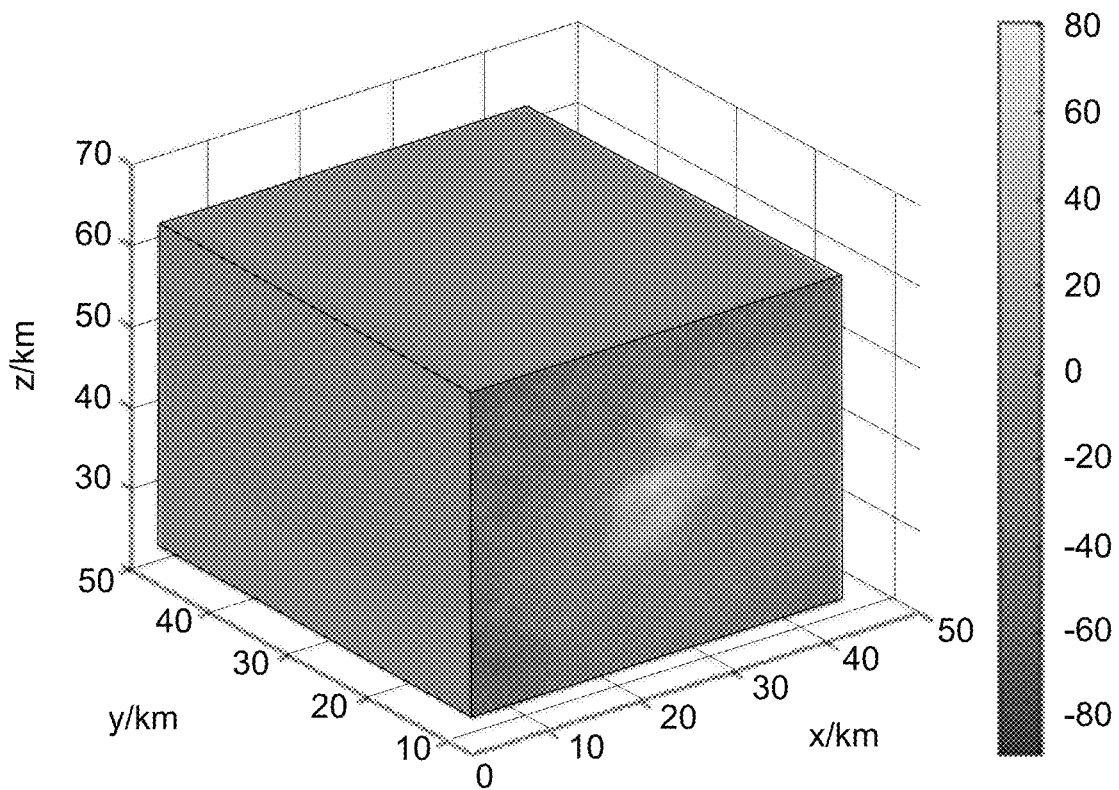
FIG. 12(a) is a schematic diagram of a power frequency magnetic field perturbation produced when the ship on the water and the underwater ferromagnetic target are 5 km apart according to Embodiment 2 of the present invention.
Figure 12B:
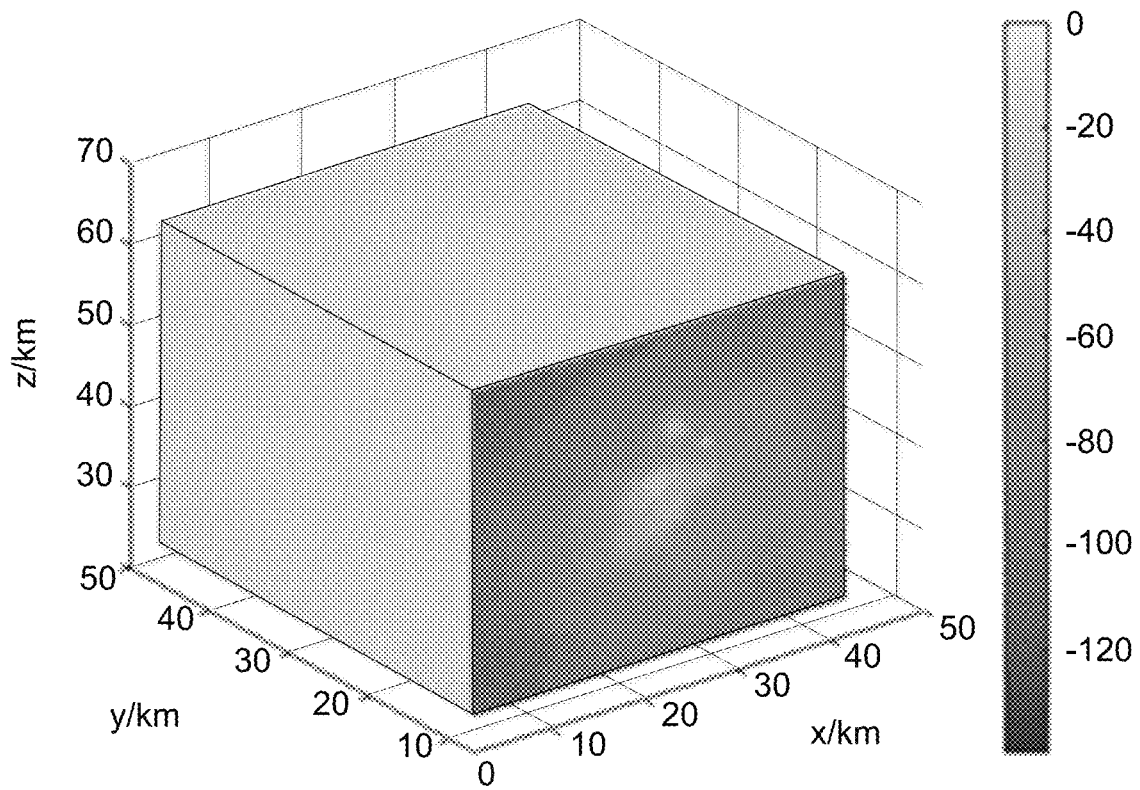
FIG. 12(b) is a schematic diagram of a power frequency electric field perturbation produced when the ship on the water and the underwater ferromagnetic target are 5 km apart according to Embodiment 2 of the present invention.

When the distance between the underwater vehicle and the ship on the water is 5 km, the power frequency magnetic field perturbation map around the underwater ferromagnetic target is shown in FIG. 12(a), and the power frequency electric field perturbation map around the underwater ferromagnetic target is shown in FIG. 12(b).

Figure 13A:
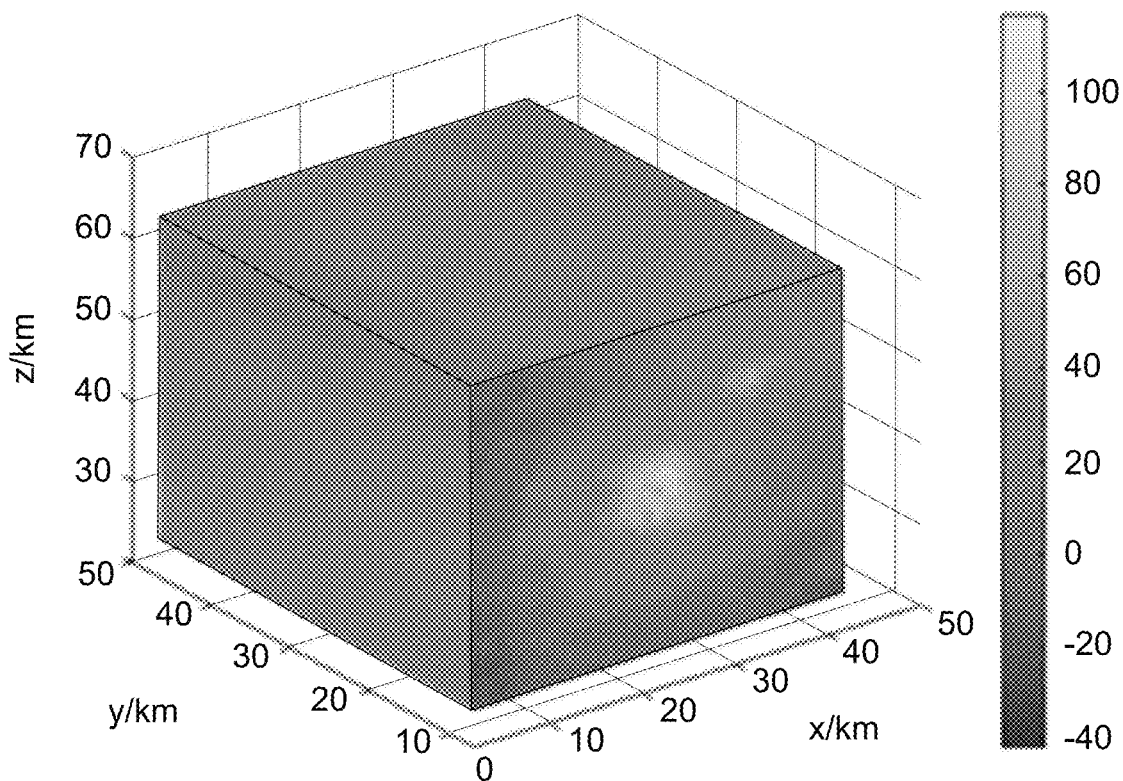
FIG. 13(a) is a schematic diagram of a power frequency magnetic field perturbation produced when the ship on the water and the underwater ferromagnetic target are 10 km apart according to Embodiment 2 of the present invention.
Figure 13B:
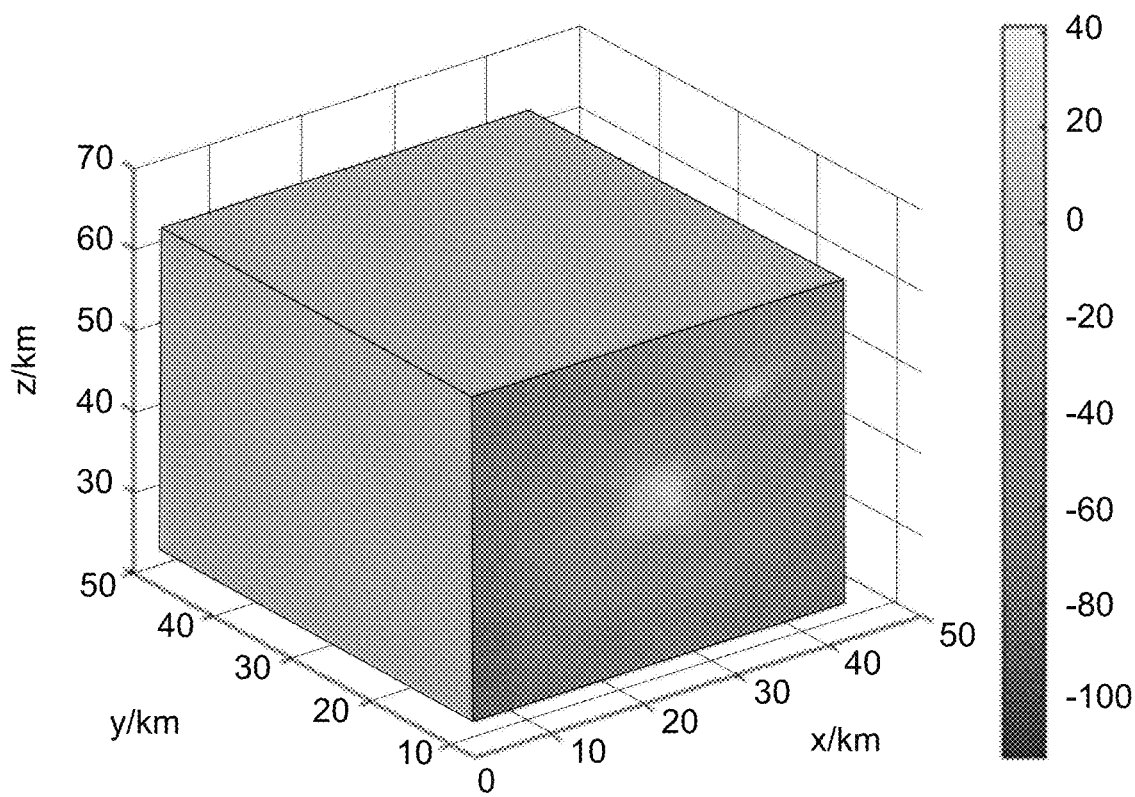
FIG. 13(b) is a schematic diagram of a power frequency electric field perturbation produced when the ship on the water and the underwater ferromagnetic target are 10 km apart according to Embodiment 2 of the present invention.

When the distance between the underwater vehicle and the ship on the water is 10 km, the power frequency magnetic field perturbation map around the underwater ferromagnetic target is shown in FIG. 13(a), and the power frequency electric field perturbation map around the underwater ferromagnetic target is shown in FIG. 13(b).

Figure 14A:
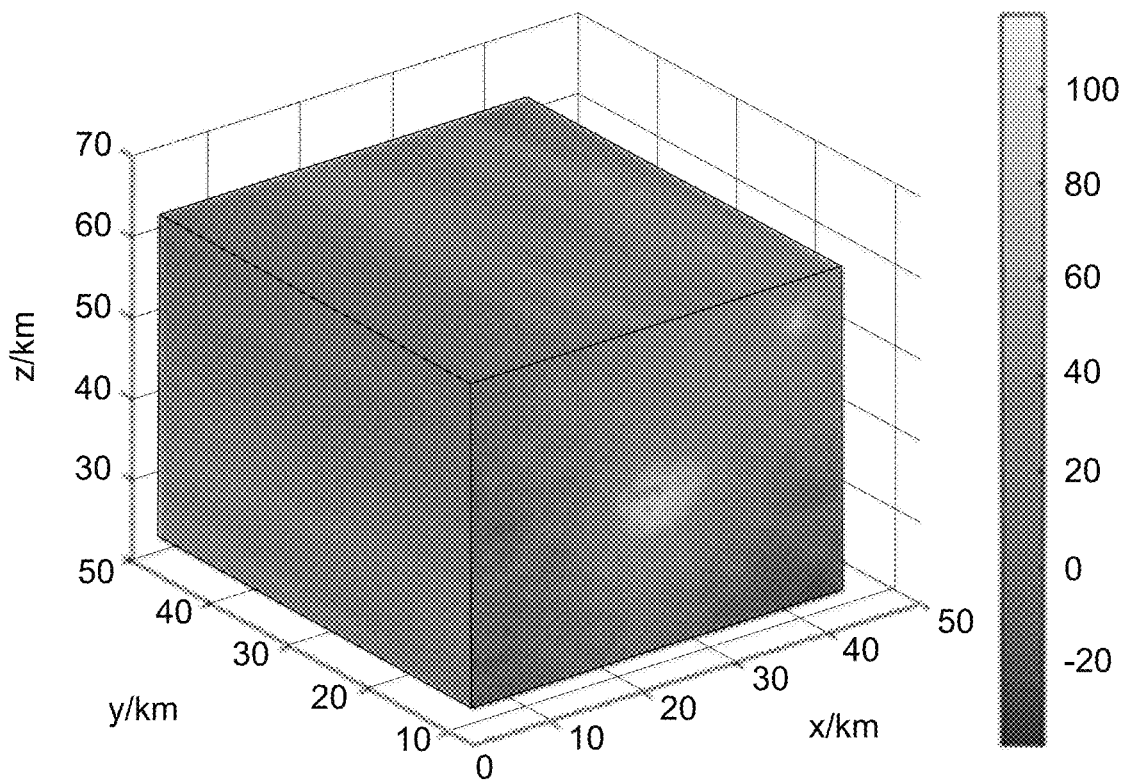
FIG. 14(a) is a schematic diagram of a power frequency magnetic field perturbation produced when the ship on the water and the underwater ferromagnetic target are 15 km apart according to Embodiment 2 of the present invention.
Figure 14B:
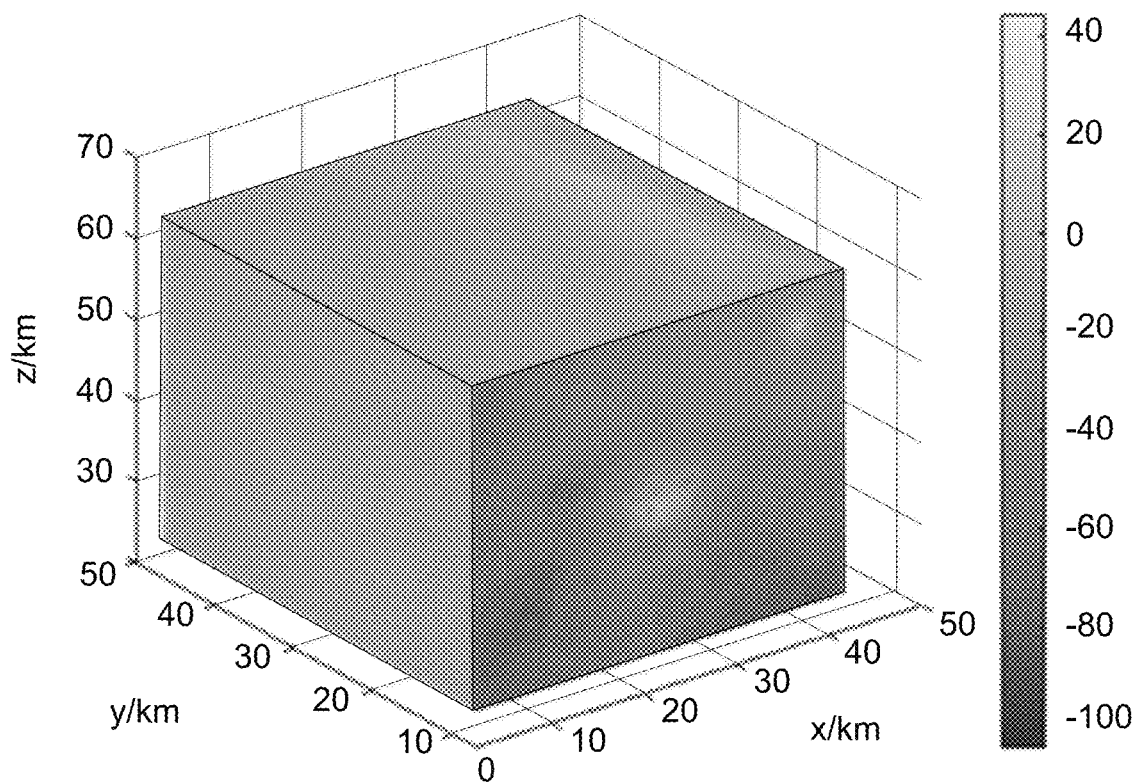
FIG. 14(b) is a schematic diagram of a power frequency electric field perturbation produced when the ship on the water and the underwater ferromagnetic target are 15 km apart according to Embodiment 2 of the present invention.

When the distance between the underwater vehicle and the ship on the water is 15 km, the power frequency magnetic field perturbation map around the underwater ferromagnetic target is shown in FIG. 14(a), and the power frequency electric field perturbation map around the underwater ferromagnetic target is shown in FIG. 14(b).

Figure 15A:
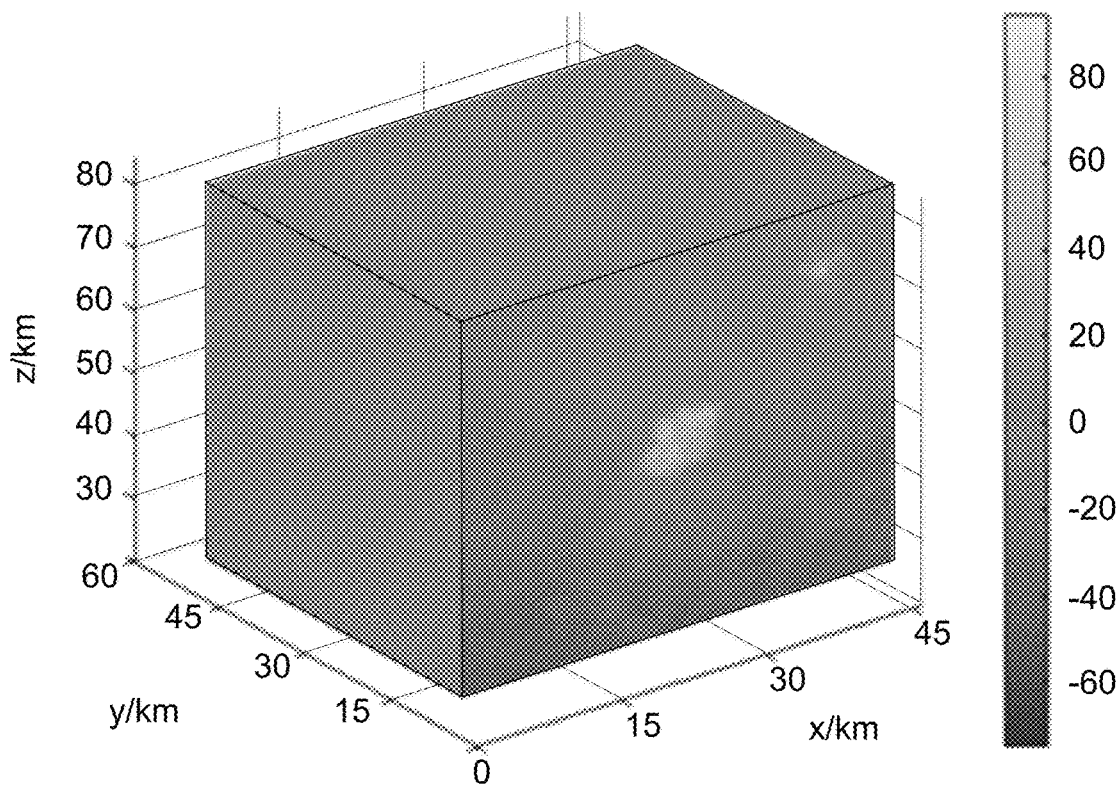
FIG. 15(a) is a schematic diagram of a power frequency magnetic field perturbation produced when the ship on the water and the underwater ferromagnetic target are 20 km apart according to Embodiment 2 of the present invention.
Figure 15B:
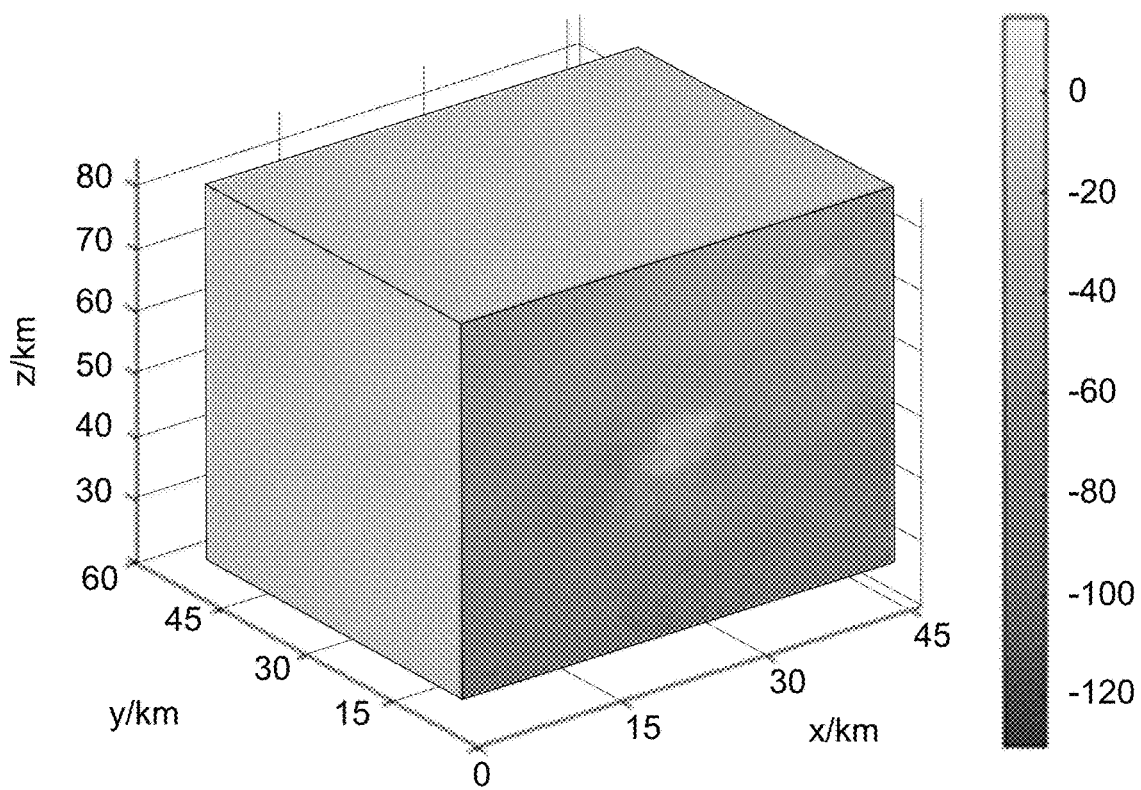
FIG. 15(b) is a schematic diagram of a power frequency electric field perturbation produced when the ship on the water and the underwater ferromagnetic target are 20 km apart according to Embodiment 2 of the present invention.

When the distance between the underwater vehicle and the ship on the water is 20 km, the power frequency magnetic field perturbation map around the underwater ferromagnetic target is shown in FIG. 15(a), and the power frequency electric field perturbation map around the underwater ferromagnetic target is shown in FIG. 15(b).

According to the power frequency magnetic field perturbation maps and power frequency electric field perturbation maps obtained when the underwater vehicle and the ship on the water are spaced apart by different distances, as the distance between the underwater vehicle and the ship continues to increase, it can be observed that two obvious brighter spots of perturbation gradually separate, and the two spots of perturbation both propagate and spread into the surrounding seawater and air medium. One of the spots of perturbation has a larger spreading range of 20 km*20 km, and the other spot of perturbation has a smaller spreading range of 5 km*5 km.

(4) A step of verifying measured data.
(4.1) Acquire an electromagnetic field signal generated when the underwater vehicle is present alone.
1) Acquire a 50-Hz electromagnetic field signal.

The data is acquired by a fluxgate sensor, the data sampling rate is set to 1,024 Hz, and the acquired data is a time domain original signal of 0-512 Hz. A sliding window Fourier transform is performed on the original signal, the step is 1 point, and the Fourier window size is 30-s data.

$$F(\omega) = \int_{-\infty}^{\infty} f(t)e^{-i\omega t}dt$$

where $F(\omega)$ is a frequency domain function, $f(t)$ is a time domain function, $\omega$ is frequency, and t is time. A 50-Hz signal $f'(t)$ is extracted from a Fourier-transformed frequency domain spectrum.

2) Perform a Fourier transform on the extracted 50-Hz signal.

The extracted $f'(t)$ is used as an original time domain signal for a Fourier transform, the step is 1 s, and the Fourier window size is 30-s data.

$$F(\omega) = \int_{-\infty}^{\infty} f'(t)e^{-i\omega t}dt$$

where $F(\omega)$ is a frequency domain function, $f(t)$ is a time domain function, $\omega$ is the frequency, and t is time.

Figure 16A:
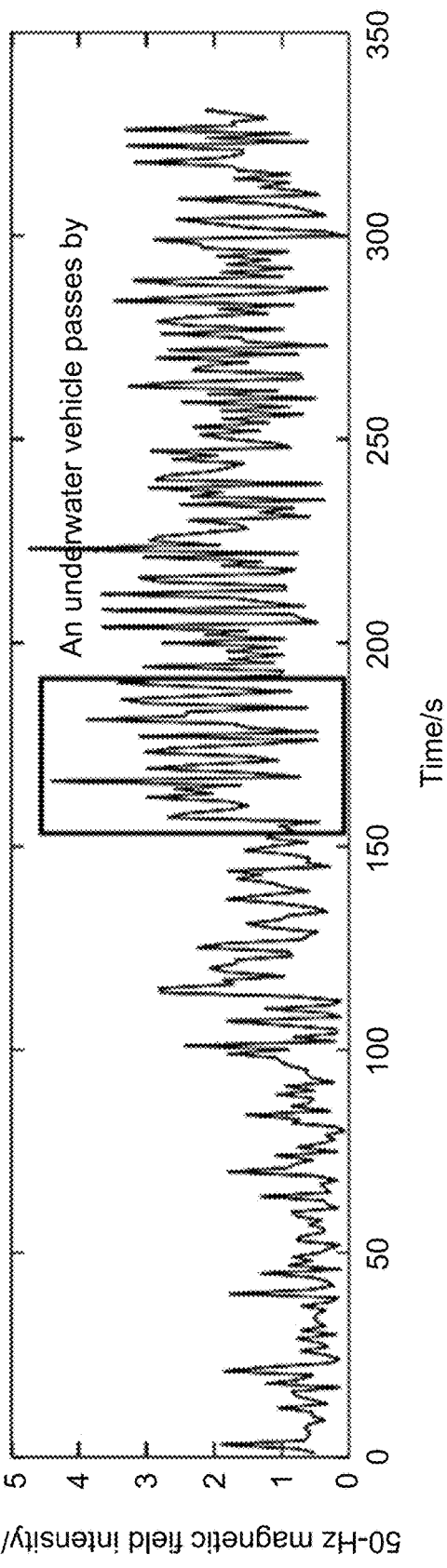
FIG. 16(a) is a magnetic field perturbation map when an underwater vehicle in Embodiment 2 of the present invention is present alone.

The 50-Hz signal is extracted from the Fourier-transformed frequency domain spectrum, and the magnetic field perturbation map when the underwater vehicle is present alone is obtained, as shown in FIG. 16(a).

(4.2) Acquire an electromagnetic field signal generated when the ship and the underwater vehicle are both present.

(4.2.1) Acquire 50-Hz signal data.

The data is acquired by a fluxgate sensor, the data sampling rate is set to 1,024 Hz, and the acquired data is a time domain original signal of 0-512 Hz. A sliding window Fourier transform is performed on the original signal, the step is 1 point, and the Fourier window size is 30-s data.

$$F(\omega) = \int_{-\infty}^{\infty} f(t)e^{-i\omega t}dt$$

where $F(\omega)$ is a frequency domain function, $f(t)$ is a time domain function, $\omega$ is the frequency, and t is time. A 50-Hz signal $f'(t)$ is extracted from the Fourier-transformed frequency domain spectrum.

(4.2.2) Perform a Fourier transform on the 50-Hz signal.

$f'(t)$ extracted in (4.2.1) is subjected to a Fourier transform, the step is 1 s, and the Fourier window size is 30-s data.

$$F'(\omega) = \int_{-\infty}^{\infty} f'(t)e^{-i\omega t}dt$$

where $F'(\omega)$ is a frequency domain function obtained after the Fourier transform is performed on the 50-Hz signal, $f'(t)$ is a time domain function of the 50-Hz signal, $\omega$ is the frequency, and t is time. The 50-Hz signal is extracted from the Fourier-transformed frequency domain spectrum, and the magnetic field perturbation map when the underwater vehicle is present alone is obtained, as shown in FIG. 16(b).

Figure 16B:
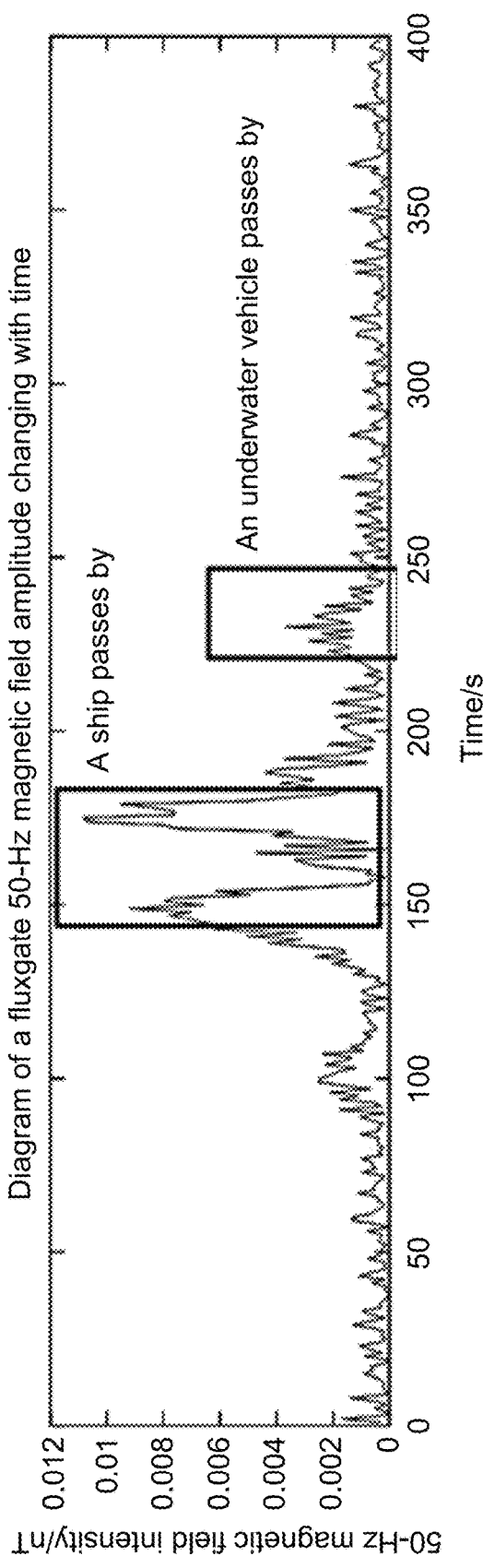
FIG. 16(b) is a magnetic field perturbation map when the underwater vehicle and the ship on the water are both present according to Embodiment 2 of the present invention.

It can be seen from the data in FIG. 16(a) and FIG. 16(b) that when the underwater vehicle is present alone, no obvious underwater vehicle perturbation signal can be seen when the underwater vehicle is 13 m offshore. When the ship and the underwater vehicle are both present, an obvious underwater vehicle perturbation signal can still be seen when the underwater vehicle is 20 m offshore. Therefore, it can be inferred that the ship on the water can enhance an underwater ferromagnetic target signal.

Specifically, an underwater ferromagnetic target detection system employing multiple power frequency radiation sources provided in Embodiment 2 of the present invention includes the following units:

a unit for a power frequency electromagnetic field and seawater to act on an underwater ferromagnetic target, configured to perform the following: a power transmission network generating a power frequency electromagnetic field in a spatial range, an underwater ferromagnetic target generating an induced electromagnetic field under the action of the power frequency electromagnetic field, and seawater inside and outside the ferromagnetic target generating alternating currents under the action of the power frequency electromagnetic field, and the alternating currents acting on the underwater ferromagnetic target to generate a secondary magnetic field, an induced current generated by the ship on the water under the action of the power frequency electromagnetic field (wave) generating a power frequency electromagnetic field (wave) serving as a secondary radiation source that acts on the underwater ferromagnetic target nearby, obtaining a secondary magnetic field generated by the underwater ferromagnetic target, and adding the secondary magnetic field, the induced electromagnetic field generated by the underwater ferromagnetic target, and the secondary magnetic field generated by the underwater ferromagnetic target under the action of the seawater inside and outside the underwater ferromagnetic target to obtain a total electromagnetic field generated by the underwater ferromagnetic target;

a unit for constructing an underwater ferromagnetic target detection model, configured to perform the following: using emulation software to construct the underwater ferromagnetic target detection model, wherein the detection model includes establishing a power transmission network model, an underwater ferromagnetic target model, and a space domain model, and the underwater ferromagnetic target model and the space domain model are further subjected to infinite element meshing;

a unit for acquiring an electromagnetic field distribution around the underwater ferromagnetic target model, configured to perform the following: performing emulation on the underwater ferromagnetic target model according to Maxwell's electromagnetic equations, acquiring a power frequency electromagnetic field distribution around the underwater ferromagnetic target, and performing underwater ferromagnetic target detection according to the power frequency electromagnetic field distribution; and a unit for verifying measured data, configured to perform the following: respectively acquiring an original time-domain signal in the presence of only the underwater ferromagnetic target and an original time-domain signal in the presence of the ship on the water passing by the ferromagnetic target, respectively performing Fourier transforms on the acquired original time-domain signals, so as to obtain a magnetic field perturbation map in the presence of only the underwater ferromagnetic target and a magnetic field perturbation map in the present of the ship on the water passing by the ferromagnetic target; and through comparison of magnetic field intensities in the magnetic field perturbation maps, verifying that the power frequency electromagnetic field perturbation is enhanced when the ship on the water passes by the underwater ferromagnetic target.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. An underwater ferromagnetic target detection method employing multiple power frequency radiation sources, comprising the following steps:
(1) a step in which a power frequency electromagnetic field and seawater act on an underwater ferromagnetic target: a power transmission network generating a power frequency electromagnetic field in a spatial range, an underwater ferromagnetic target generating an induced electromagnetic field under the action of the power frequency electromagnetic field, and seawater inside and outside the underwater ferromagnetic target generating alternating currents under the action of the power frequency electromagnetic field, and the alternating currents acting on the underwater ferromagnetic target to generate a secondary magnetic field; if there is a ship on the water serving as a secondary radiation source acting on the underwater ferromagnetic target, performing step (2); or, if there is no ship on the water serving as a secondary radiation source acting on the underwater ferromagnetic target, adding the induced electromagnetic field generated by the underwater ferromagnetic target and the secondary magnetic field generated by the underwater ferromagnetic target under the action of the seawater inside and outside the underwater ferromagnetic target to obtain a total electromagnetic field generated by the underwater ferromagnetic target, and performing step (3);
(2) a step in which the ship on the water serving as the secondary radiation source acts on the underwater ferromagnetic target: an induced current generated by the ship on the water under the action of the power frequency electromagnetic field (wave) generating a power frequency electromagnetic field (wave) serving as the secondary radiation source that acts on the underwater ferromagnetic target nearby, obtaining a secondary magnetic field generated by the underwater ferromagnetic target, and using the secondary magnetic field, the induced electromagnetic field generated by the underwater ferromagnetic target, and the secondary magnetic field generated by the underwater ferromagnetic target under the action of the seawater inside and outside the underwater ferromagnetic target as a total electromagnetic field generated by the underwater ferromagnetic target, and performing step (3); and
(3) a step of performing underwater ferromagnetic target detection: the total electromagnetic field generated by the underwater ferromagnetic target disturbing the power frequency electromagnetic field, so as to acquire a power frequency electromagnetic field distribution around the underwater ferromagnetic target, and performing underwater ferromagnetic target detection according to the power frequency electromagnetic field distribution.

2. The underwater ferromagnetic target detection method employing multiple power frequency radiation sources according to claim 1, wherein the step in which a power frequency electromagnetic field and seawater act on an underwater ferromagnetic target specifically comprises:
  the power transmission network generating a power frequency electromagnetic field $\vec{B}^f$ in space, $\vec{B}^f$ being a temporal and spatial four-dimensional function; the power frequency electromagnetic field acting on the underwater ferromagnetic target and generating an induced electromagnetic field $\vec{B}_{induce}^T$;
  the underwater ferromagnetic target being magnetized under the action of the power frequency electromagnetic field, and a magnetization thereof being proportional to an intensity of the power frequency electromagnetic field and a magnetic permeability of the underwater ferromagnetic target;
  the underwater ferromagnetic target being controlled by introducing and discharging seawater during diving and surfacing processes, a large amount of seawater being present inside the underwater ferromagnetic target;
  the seawater inside the underwater ferromagnetic target serving as an electrical conductor and generating an alternating current under the action of the power frequency electromagnetic field, and the alternating current acting on a secondary magnetic field $\vec{B}_{induce1}^{sea}$ generated by the underwater ferromagnetic target;
  the seawater outside of and surrounding the underwater ferromagnetic target serving as an electrical conductor and generating an alternating current under the action of the power frequency electromagnetic field, and the alternating current acting on a secondary magnetic field $\vec{B}_{induce2}^{sea}$ generated by the underwater ferromagnetic target; and
  obtaining a total power frequency electromagnetic field $\vec{B}_{induce}^{enhance}$ generated by the underwater ferromagnetic target under the combined action of the power frequency electromagnetic field and the seawater inside and outside the underwater ferromagnetic target, a calculation formula for the total electromagnetic field $\vec{B}_{induce}^{enhance}$ being:

$\vec{B}_{induce}^{enhance} = \vec{B}_{induce1}^{sea} + \vec{B}_{induce2}^{sea} + \vec{B}_{induce}^T$.

3. The underwater ferromagnetic target detection method employing multiple power frequency radiation sources according to claim 1, wherein the step in which the ship on the water serving as the secondary radiation source acts on the underwater ferromagnetic target specifically comprises:
  a single ship on the water generating an induced secondary field under the action of the power frequency electromagnetic field according to Faraday's law, and the induced secondary field serving as a secondary radiation source; when there are multiple ships on the water, adding secondary field vectors generated by the multiple ships on the water to obtain multiple secondary radiation sources, wherein when power frequency electromagnetic fields generated by the multiple secondary radiation sources act on the underwater ferromagnetic target, a calculation formula for a total secondary magnetic field $\vec{B}_{induce}^{ship}$ generated by the underwater ferromagnetic target is as follows:

$\vec{B}_{induce}^{ship} = \sum_{i=1}^{n} \vec{B}_{induce1}^{ship}$ wherein $\vec{B}_{induce1}^{ship}$ is a secondary magnetic field generated by the underwater ferromagnetic target when a single secondary radiation source acts on the underwater ferromagnetic target, and n represents the number of ships on the water; and
  under the action of the power frequency electromagnetic fields generated by the multiple secondary radiation sources, the total electromagnetic field generated by the underwater ferromagnetic target is $\vec{B}^T$:

$\vec{B}^T = \vec{B}_{induce}^{ship} + \vec{B}_{induce}^{enhance}$.

4. The underwater ferromagnetic target detection method employing multiple power frequency radiation sources according to claim 1, wherein the step of performing underwater ferromagnetic target detection specifically comprises:
  establishing an underwater ferromagnetic target detection model, performing emulation on an underwater ferromagnetic target model according to Maxwell's electromagnetic equations, acquiring a power frequency electromagnetic field distribution around the underwater ferromagnetic target, and performing underwater ferromagnetic target detection according to the power frequency electromagnetic field distribution.

5. The underwater ferromagnetic target detection method employing multiple power frequency radiation sources according to claim 4, wherein the establishing an underwater ferromagnetic target detection model is specifically as follows:
  the establishing an underwater ferromagnetic target detection model comprises: establishing a power transmission network model, the underwater ferromagnetic target model, and a space domain model.

6. The underwater ferromagnetic target detection method employing multiple power frequency radiation sources according to claim 5, wherein the establishing a power transmission network model specifically comprises:
  acquiring a node distribution, an altitude, and a power transmission loop distribution of the power transmission network;
  creating a curve layer of the power transmission network, using curves in the curve layer as a geometric description of power transmission loops, and using the geometric description as an excitation source for the underwater ferromagnetic target model;
  setting parameters of the curves according to the node distribution and loop information of the power transmission network, and configuring a position distribution for the curves according to the altitude; and
  performing value assignment with respect to the excitation source of the underwater ferromagnetic target model according to magnitudes of transmission currents and transmission voltages of different loops in the transmission network.

7. The underwater ferromagnetic target detection method employing multiple radiation sources according to claim 5, wherein the underwater ferromagnetic target model is specifically as follows:
  the underwater ferromagnetic target model comprises: a geometric description of the underwater ferromagnetic target model, position coordinates of the center point of the underwater ferromagnetic target model, and material properties of the underwater ferromagnetic target model, wherein the geometric description of the underwater ferromagnetic target model is a hollow assembly composed of a plurality of conventional geometric bodies; the position coordinates of the center point of the underwater ferromagnetic target model are coordinates on the x, y, and z coordinate axes in a space rectangular coordinate system; the material properties of the underwater ferromagnetic target model comprise a relative permeability of a material of the underwater ferromagnetic target model, a relative conductivity of the material of the underwater ferromagnetic target model, a relative dielectric constant of the material of the underwater ferromagnetic target model, and a density of the material of the underwater ferromagnetic target model;

the underwater ferromagnetic target model is further subjected to finite element meshing, and the size of a mesh of the underwater ferromagnetic target model is adaptive according to the size of the underwater ferromagnetic target model.

8. The underwater ferromagnetic target detection method employing multiple radiation sources according to claim 5, wherein the space domain model is specifically as follows:

the space domain model is a medium layer for propagation of the power frequency electromagnetic field; the medium layer comprises: an air layer, a sea layer, a land layer, a seabed layer, and an ionized layer; and the space domain model is further subjected to finite element meshing, and the size of a mesh of the space domain model is adaptive according to the size of the space domain model.

9. The underwater ferromagnetic target detection method employing multiple power frequency radiation sources according to claim 1, wherein a step of verifying measured data is further included to follow the step of performing underwater ferromagnetic target detection, and specifically comprises:

respectively acquiring an original time domain signal in the presence of only the underwater ferromagnetic target and an original time domain signal in the presence of the ship on the water passing by the underwater ferromagnetic target; respectively performing Fourier transforms on the acquired original time domain signals, so as to obtain a magnetic field perturbation map in the presence of only the underwater ferromagnetic target and a magnetic field perturbation map in the presence of the ship on the water passing by the ferromagnetic target model; and through comparison of magnetic field intensities in the magnetic field perturbation maps, verifying that a power frequency electromagnetic field perturbation of the underwater ferromagnetic target is enhanced when the ship on the water passes by the underwater ferromagnetic target.

10. An underwater ferromagnetic target detection system employing multiple radiation sources, comprising the following units:

a unit for a power frequency electromagnetic field and seawater to act on an underwater ferromagnetic target, configured to perform the following: a power transmission network generating a power frequency electromagnetic field in a spatial range, an underwater ferromagnetic target generating an induced electromagnetic field under the action of the power frequency electromagnetic field, and seawater inside and outside the underwater ferromagnetic target generating alternating currents under the action of the power frequency electromagnetic field, and the alternating currents acting on the underwater ferromagnetic target to generate a secondary magnetic field; if there is a ship on the water serving as a secondary radiation source acting on the underwater ferromagnetic target, proceeding to a unit for the ship on the water serving as the secondary radiation source to act on the underwater ferromagnetic target; or, if there is no ship on the water serving as a secondary radiation source acting on the underwater ferromagnetic target, adding the induced electromagnetic field generated by the underwater ferromagnetic target and the secondary magnetic field generated by the underwater ferromagnetic target under the action of the seawater inside and outside the underwater ferromagnetic target to obtain a total electromagnetic field generated by the underwater ferromagnetic target, and proceeding to a unit for performing underwater ferromagnetic target detection;

the unit for the ship on the water serving as the secondary radiation source to act on the underwater ferromagnetic target, configured to perform the following: an induced current generated by the ship on the water under the action of the power frequency electromagnetic field (wave) generating a power frequency electromagnetic field (wave) serving as the secondary radiation source to act on the underwater ferromagnetic target nearby, obtaining a secondary magnetic field generated by the underwater ferromagnetic target, and using the secondary magnetic field, the induced electromagnetic field generated by the underwater ferromagnetic target, and the secondary magnetic field generated by the underwater ferromagnetic target under the action of the seawater inside and outside the underwater ferromagnetic target as a total electromagnetic field generated by the underwater ferromagnetic target, and proceeding to the unit for performing underwater ferromagnetic target detection; and the unit for performing underwater ferromagnetic target detection, configured to perform the following: the total electromagnetic field generated by the underwater ferromagnetic target disturbing the power frequency electromagnetic field, so as to acquire a power frequency electromagnetic field distribution around the underwater ferromagnetic target, and performing underwater ferromagnetic target detection according to the power frequency electromagnetic field distribution.

* * * * *